United States Patent [19]

Clausen et al.

[11] Patent Number: 5,643,446

[45] Date of Patent: Jul. 1, 1997

[54] FUEL FILTER AND PRIMING PUMP

[75] Inventors: Michael D. Clausen, Turlock; Russell D. Jensen; Walter H. Stone, both of Modesto, all of Calif.

[73] Assignee: Parker Hannifin Corporation, Cleveland, Ohio

[21] Appl. No.: 150,709

[22] Filed: Nov. 10, 1993

Related U.S. Application Data

[63] Continuation-in-part of Ser. No. 28,101, Mar. 8, 1993, Pat. No. 5,362,392, and a continuation-in-part of Ser. No. 97,787, Jul. 27, 1993, abandoned, which is a division of Ser. No. 683,096, Apr. 10, 1991, Pat. No. 5,244,571, which is a continuation of Ser. No. 586,827, Sep. 24, 1990, abandoned, which is a division of Ser. No. 370,097, Jun. 20, 1989, Pat. No. 4,997,555, which is a continuation of Ser. No. 242,791, Sep. 9, 1988, abandoned, which is a continuation of Ser. No. 32,834, Mar. 30, 1987, abandoned, which is a continuation-in-part of Ser. No. 784,292, Oct. 7, 1985, Pat. No. 4,692,245, which is a continuation-in-part of Ser. No. 733,808, May 14, 1985, Pat. No. 4,668,393.

[51] Int. Cl.$^6$ ................................................. B01D 35/14
[52] U.S. Cl. ........................ 210/184; 210/234; 210/235; 210/416.4; 210/444; 210/450; 210/455
[58] Field of Search ............................. 210/86, 184, 234, 210/235, 307, 313, 416.4, 440, 444, 450, 493.2, DIG. 17, 248, 455

[56] References Cited

U.S. PATENT DOCUMENTS

| | | |
|---|---|---|
| 1,468,906 | 9/1923 | Inman . |
| 1,746,336 | 2/1930 | Breer . |
| 2,431,782 | 12/1947 | Walton et al. . |
| 2,544,244 | 3/1951 | Vokes . |
| 3,040,894 | 6/1962 | Pall . |
| 3,056,503 | 10/1962 | Roosa . |
| 3,105,042 | 9/1963 | Roosa . |
| 3,363,762 | 1/1968 | Ensign . |
| 3,529,727 | 9/1970 | Bernhard . |
| 3,931,011 | 1/1976 | Richards et al. . |
| 4,052,307 | 10/1977 | Humbert, Jr. . |
| 4,237,015 | 12/1980 | Fearnhead ........................... 210/444 |
| 4,437,986 | 3/1984 | Hutchins et al. ................... 210/416.4 |
| 4,508,621 | 4/1985 | Jackson .............................. 210/86 |
| 4,522,712 | 6/1985 | Fischer et al. ...................... 210/86 |
| 4,619,764 | 10/1986 | Church et al. . |
| 4,668,393 | 5/1987 | Stone ................................. 210/304 |
| 4,692,245 | 9/1987 | Church et al. ...................... 210/232 |
| 4,732,671 | 3/1988 | Thornton et al. ................ 210/DIG. 17 |
| 4,836,923 | 6/1989 | Popoff et al. . |
| 4,997,555 | 3/1991 | Church et al. ..................... 210/136 |
| 5,020,610 | 6/1991 | Lyon et al. . |
| 5,084,170 | 1/1992 | Janik et al. . |
| 5,244,571 | 9/1993 | Church et al. ..................... 210/232 |
| 5,362,390 | 11/1994 | Widenhoefer et al. ............ 210/235 |

FOREIGN PATENT DOCUMENTS

| | | |
|---|---|---|
| 570727 | 9/1958 | Belgium ............................ 210/235 |
| 0079841 | 5/1983 | European Pat. Off. . |
| 0164548 | 12/1985 | European Pat. Off. . |
| 0260069 | 3/1988 | European Pat. Off. . |
| 0289188 | 11/1988 | European Pat. Off. . |
| 1075424 | 7/1967 | United Kingdom . |

*Primary Examiner*—Matthew O. Savage
*Attorney, Agent, or Firm*—Renner, Otto, Boisselle & Sklar

[57] ABSTRACT

A fuel filter comprises a head (10, 96) having an inlet (14, 100) and an outlet (16,102). The head has a pumping portion (18, 104) which includes a vertically extending stepped bore (46, 120) having movable bodies (86, 88; 132, 140) therein. The fluid area between the bodies (54, 126) is connected to a variable volume area (77, 160). The head is connected to an element (98, 266) by a nipple portion (186) which has a valve element (196) therein. An actuating projection (222, 272) is engagable with said valve element to open flow through said nipple portion when the correct element is attached thereto. The failure of the nipple portion to sufficiently extend in the element, which occurs when an improper element is attached, prevents flow through the nipple portion and renders the filter inoperable. The actuating projection is further supported on a central portion (220, 276) which prevents connection to a nipple portion that extends too far into the element. As a result, only the proper element may be mounted to the head.

30 Claims, 20 Drawing Sheets

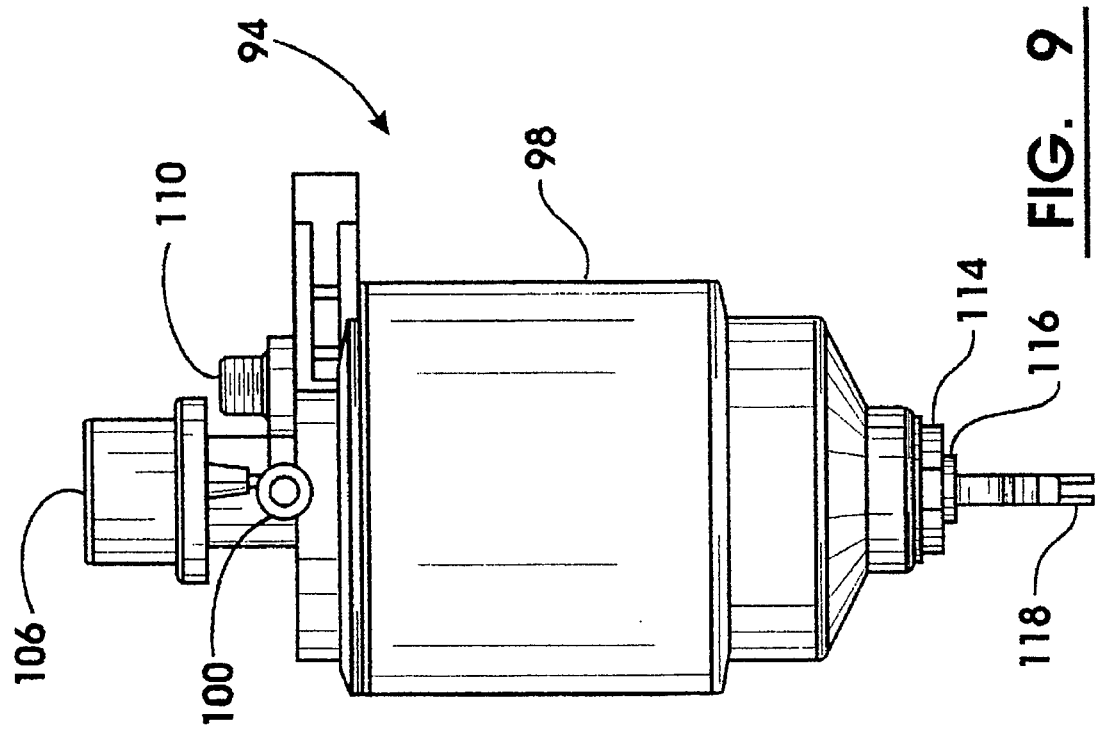
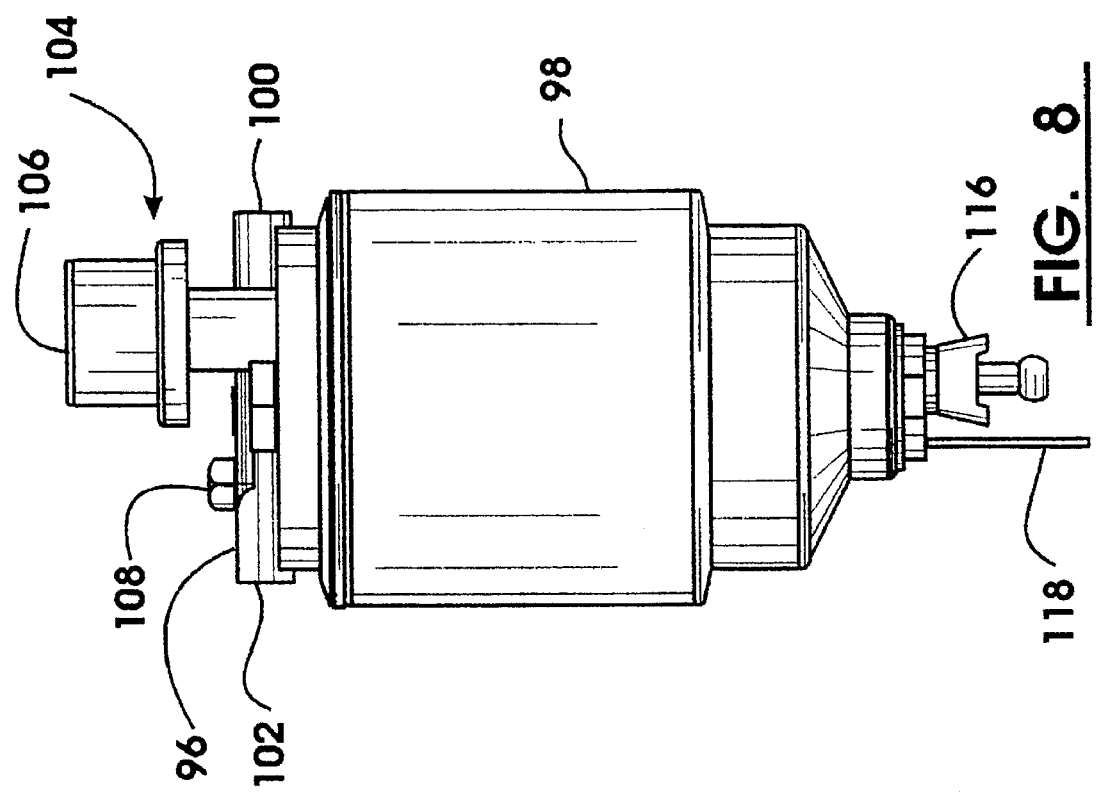

FUEL FILTER AND PRIMING PUMP

CROSS REFERENCE TO RELATED APPLICATIONS

This Application is a continuation-in-part of application Ser. No. 08/028,101 filed Mar. 8, 1993 now U.S. Pat. No. 5,362,392. It is also a continuation-in-part of application Ser. No. 08/097,787 filed on Jul. 27, 1993, now abandoned, which is a division of application Ser. No. 07/683,096 filed on Apr. 10, 1991, now U.S. Pat. No. 5,244,571, which is a continuation of application Ser. No. 07/586,827 filed on Sep. 24, 1990, now abandoned, which is a division of application Ser. No. 07/370,097 filed on Jun. 20, 1989, now U.S. Pat. No. 4,997,555, which is a continuation of application Ser. No. 07/242,791 filed on Sep. 9, 1988, now abandoned, which is a continuation of application Ser. No. 07/032,834 filed on Mar. 30, 1987, now abandoned, which is a continuation-in-part of application Ser. No. 06/784,292 filed on Oct. 7, 1985, now U.S. Pat. No. 4,692,245, which is a continuation-in-part of application Ser. No. 06/733,808 filed on May 14, 1985, now U.S. Pat. No. 4,668,393, the disclosures of which are incorporated herein by reference.

TECHNICAL FIELD

This invention relates to fuel filters and separators for vehicles. Specifically, the invention relates to a fuel filter that includes a filter head, a removable filter element, a heater and an integral priming pump.

BACKGROUND ART

Many types of fuel filters and separators are known in the prior art. A popular type of filter and/or separator construction is a type that has a filter head to which a replaceable "spin on" element is attached. The head is a permanent part of the fuel system of the vehicle and includes inlet and outlet connections to the fuel lines. The element may be readily removed from the filter head and a new one attached without opening the fuel line connections to the filter head.

Problems may arise when the element is replaced. The old element which is removed, is filled with fuel. The new element when it is installed, is not. Therefore, the new element introduces an air pocket into the system. This air pocket may prevent fuel flow if fuel is drawn through the head and element by vacuum produced by a downstream fuel pump. However, even if the fuel is pushed through the element and the filter head, a large slug of air in the system may cause damage to downstream components such as an injector pump or fuel injectors.

Skilled mechanics sometimes attempt to fill a new element with clean fuel before it is installed. This reduces the size of the air pocket but does not eliminate the problem.

To eliminate the air pocket in a replacement filter or separator element, others have installed priming pumps on a filter head. Such priming pumps are of two types. The first type has two flow paths for fuel through the filter head. The first flow path passes fuel from the inlet of the head directly to a fluid in-flow area of an attached element. The fuel normally flows along this first path when the engine of the vehicle is running.

When the element has been replaced and there is a need to remove an air pocket from the system, a manual valve on the filter head is actuated to select the second flow path. The second flow path directs fuel from the inlet to a pumping chamber. The pumping chamber may be a variable volume area of a manually actuated piston or diaphragm pump. Appropriate valving is used to draw fuel from the inlet into the variable volume area of the pump and then to deliver the fuel from the pump to the in-flow area of the filter element.

The pumping of fuel into the in-flow area of the filter forces liquid fuel into the element. The liquid displaces the air which may be either exhaust through a vent in the filter head or forced from the outlet of the head and moved down the fuel line to an area beyond the fuel pump or other components that could be adversely affected by air in the line.

Once the air pocket has been displaced the manual valve on the head is returned to its original position. In this condition fuel again passes directly from the inlet of the head to the fuel in-flow area of the element.

A disadvantage of this construction is that it requires the use of a manual valve in the filter head. The operator must remember to actuate this valve during priming and return the valve to its original condition after the priming operation is complete. Failure to return the valve to its original position may cause a malfunction. The pump and valve construction also adds significantly to the cost of the filter head.

An alternative type of prior art filter head construction includes a priming pump directly in the fluid flow path between the inlet to the head and the in-flow area of the element. In this design fluid passes through a first check valve on the downstream side of the pumping chamber that allows fluid to flow only into the pumping chamber from the inlet. A second check valve is fluidly aligned in the fluid path on the opposite side of the pump to allow fluid to flow only out of the pumping chamber.

When it is necessary to prime the element, the pump is actuated and the valves operate to force fuel into the inflow area of the element. After priming, when the engine is started, a vacuum is drawn on the element if the fuel pump is positioned downstream of the filter head. The vacuum is sufficient to open flow through the check valves. If a fuel pump is positioned upstream from the filter head, the fluid pressure on the inlet of the filter head is sufficient to open flow through the check valves.

A problem with this configuration is the cost associated with building a head with flow passages, a pump and check valves. A further problem is that the check valves which are always in the flow path, pose restrictions to fluid flow when the engine is in the normal running condition. Thus, there exists a need for a filter head for mounting a filter or separator element that includes an integral priming pump that is inexpensive to manufacture, easy to use and has low flow resistance.

A further problem with prior art fuel filters has been the leakage of fuel out of the filter head and the introduction of air into the system when the filter element is changed. As filters are often mounted in a relatively low position in the fuel system, considerable leakage and air introduction may occur. This can make starting the engine difficult or may require excessive priming after a filter change.

Another problem associated with changing filters is fuel spillage. The fuel lines and element are often under pressure. When the element is removed the pressure is relieved and the fuel spills out. This can present a fire hazard as well as a waste clean up problem.

A further problem associated with prior art filters is that filter elements having different filtration capabilities often have an identical mounting configuration and may fit on the same filter head. However, use of the wrong filter can cause poor engine performance and allow undesirable amounts of contaminants which shortens engine life.

3

Thus, there exists a need for a fuel filter that minimizes the risk that an improper filter will be used, minimizes fuel spillage and reduces the amount of air entry into the fuel system.

DISCLOSURE OF INVENTION

It is an object of the present invention to provide a filter head with an integral priming pump.

It is a further object of the present invention to provide a filter head with an integral priming pump that is readily manufactured.

It is a further object of the present invention to provide a filter head with an integral priming pump that is easy to operate.

It is a further object of the present invention to provide a filter head with an integral priming pump that provides low resistance to flow.

It is a further object of the present invention to provide a filter head with an integral priming pump that has few moving parts.

It is a further object of the present invention to provide a fuel filter that reduces the amount of air that enters the fuel system during an element change.

It is a further object of the present invention to provide a fuel filter that minimizes the amount of fuel spillage during an element change.

It is a further object of the present invention to provide a fuel filter that insures that only the correct element for the system is attached to the head.

Further objects of the present invention will be made apparent in the following Best Modes for Carrying Out Invention and the appended claims.

The foregoing objects are accomplished in a first preferred embodiment of the invention by a filter head adapted for mounting a replaceable separator or filter element thereon. The element has an in-flow area for accepting incoming fuel, and an out-flow area for delivering fuel that has passed through the element.

The filter head includes an inlet for receiving incoming fuel from the fuel tank or other source of supply. The inlet is in fluid communication with the in-flow area of the element. The head also has an outlet which is in fluid communication with the outflow area of the element through a fluid passage in the head. The outlet of the head is connected to the remainder of the vehicle fuel system including the carburetor or fuel injection system of the engine.

An axial bore extends through the filter head. The bore extends downward from a bore opening in an exterior wall of the head. The bore has three cylindrical areas, each area of increasing diameter, with the largest diameter area of the bore adjacent to the opening. The opening in the exterior wall is closed by a plug.

The first area of the bore, which is the smallest in diameter, is in fluid communication with the inlet to the head. The second area is in fluid connection with a pumping chamber of the manual pump section of the head. A first circular opening extends between the first and second areas and is bounded by an inwardly tapered seat.

The second area of the bore is in fluid communication with the third area through a second circular opening which is of larger diameter than the first opening. The second opening is also bounded by a circular seat. The third area is in fluid connection through a fluid passage with the fluid in-flow area of the element.

4

A first spherical body is positioned in the bore generally in the second area. The first body is comprised of a material having a density greater than the fuel. The body is sized for acceptance by the seat surrounding the first opening. A second larger spherical body is generally positioned in the third area. The second body is sized for acceptance by the seat surrounding the second opening.

When it is desired to conduct a priming operation after an element change, the manual pump portion of the head is actuated to draw a vacuum in the second area of the bore. The vacuum pulls the first body off its seat and siphons fuel into the second area from the inlet. As the vacuum is drawn on the second area, the second body is held on its seat preventing flow between the second and third areas.

When the pump is actuated to apply pressure in the second area, the first body in the bore moves adjacent to the first seat and blocks flow between the first and second areas. The pressure in the second area forces the second body off its seat and fuel flows from the second area to the third area which results in the delivery of fuel to the fluid in-flow area of the element. This process is repeated with each cycle of the pumping portion of the head until all the air is forced out of the element. The air passes out of the element through a vent in the head, or in some systems may be forced out the outlet of the head and moved to a point downstream where it does not impair operation of the fuel system.

After the priming operation is complete, the engine of the vehicle on which the fuel filter is installed may be started and flow commenced through the filter head and the element. As fuel is drawn into the inlet of the head, both bodies in the axial bore move off their associated seats to enable flow. Both bodies are sized relative to the diameters of the bore so as to pose minimal restriction to flow through the filter head.

An alternative preferred embodiment has a filter head with a three chamber bore surrounded by a cylindrical sleeve. The sleeve extends longitudinally beyond the bore. The bore is closed by closure disk member. A pump cap is mounted for longitudinal movement on an annularly extending stepped projection at the top of the sleeve. The stepped projection supports an annular seal that extends between the projection and a cylindrical inside wall of the cap. The cap is biased outwardly from the bore by a spring. The cap is movable against the force of the spring to provide a variable volume chamber in which pressure and vacuum may be alternatively produced.

The closure disk member includes an opening therethrough that is in fluid communication with the second chamber of the bore. As a result, reciprocating movement of the pump cap causes the bodies which serve as check valves mounted in the bore to fill a new element with fuel and remove air therefrom in the manner of the previously described embodiment.

The alternative embodiment further includes a filter with a nipple portion which threadably attaches the element to the head. The nipple portion includes a valve element therein. The valve element is positioned in the fuel passage in the nipple portion and is biased by a spring to move to the closed position.

The filter element has a generally cylindrical housing with an annular ring of filter media therein. The filter media divides a peripheral fuel chamber from a central fuel chamber. The filter media is bounded at a first upper end by a first end cap. The first end cap has a first annular end cap wall which extends longitudinally and is disposed radially interiorly of the filter media in the central fuel chamber. The first end cap has a central portion with fluid passages therethrough traversely spanning the annular end cap wall.

In diametrically centered relation of the annular end cap wall is an outward extending actuating projection. The actuating projection has a free end within the central fuel chamber. The free end is aligned with a first opening in a tap plate of the element which accepts the nipple portion therein when the element is attached to said head.

Attachment of the element and the head causes the actuating projection in the nipple portion to engage and move the valve element therein to the open position. This enables fuel to flow out of the filter element. Disengagement of the element causes the valve element to move to the closed position so that air may not readily enter the head or the remainder of the fuel system. Further, the closure of the valve element prevents fuel from flowing out of the head through the nipple portion.

The actuating member is sized and positioned longitudinally so that the actuating member inside the element engages and opens the valve element in the nipple portion when the element is attached to the head. The actuating member may be positioned within various element types at different longitudinal positions each of which corresponds to a particular configuration of a nipple portion. As a result, only the proper element will operate in conjunction with the filter head. This assures proper filtration which provides optimum engine performance and prolongs engine life.

BRIEF DESCRIPTION OF DRAWINGS

FIG. 8 is a front view of the filter head shown in FIG. 7 attached to an alternative embodiment filter element.

FIG. 9 is a right side view of the filter head and element assembly shown in FIG. 8.

BEST MODES FOR CARRYING OUT INVENTION

Figure 2:
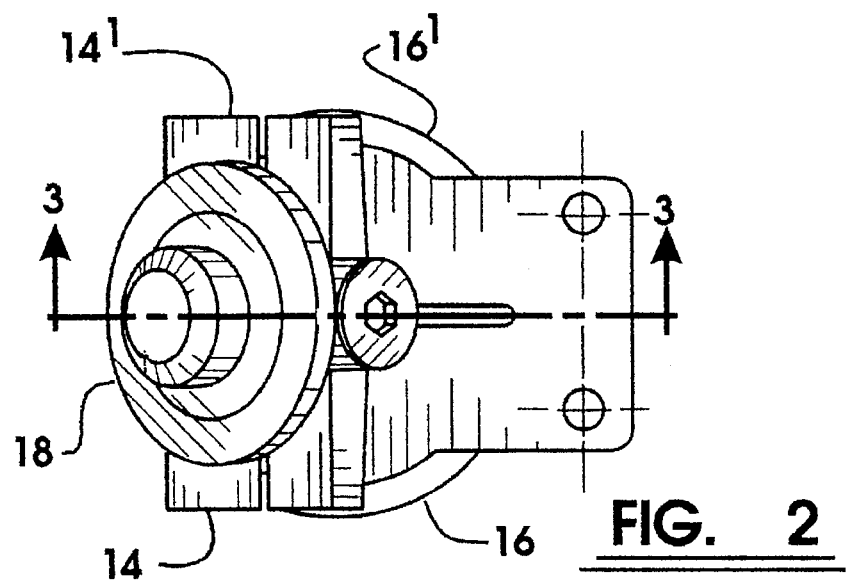
FIG. 2 is a top view of the filter head and element shown in FIG. 1.
Figure 1:
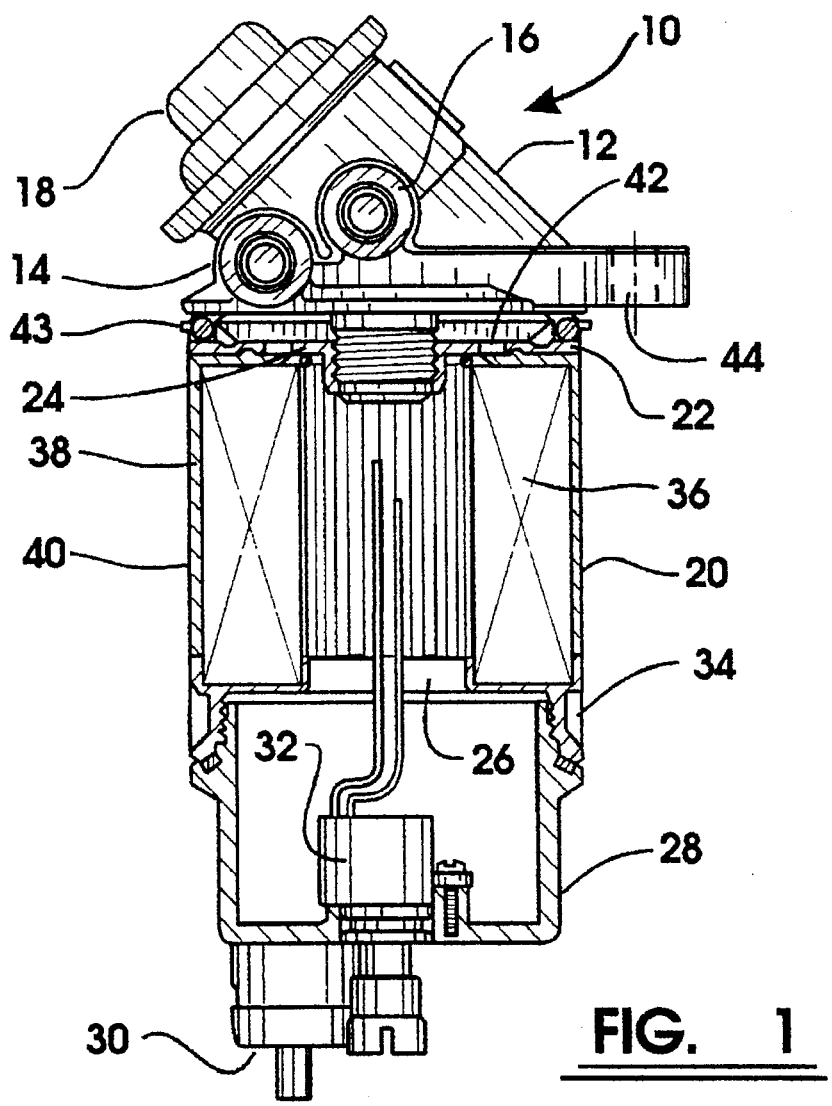
FIG. 1 is a partially sectioned side view of the filter head with integral pumping pump of the present invention with an attached separator element.

Referring now to the drawings and particularly to FIG. 1, there is shown therein a first preferred embodiment of the filter head with integral priming pump of the present invention generally indicated 10. The head has as body 12 with an inlet 14 and an outlet 16. The inlet and outlet have threaded openings to enable attachment of the filter head to fuel lines or other conduits of the fuel system of a vehicle on which the filter head is used.

Although for purposes of this discussion the inlet and outlet of the filter head are indicated as being on the same side of the head, those skilled in the art will know that similar inlet and outlet ports 14' and 16' respectively, are positioned on the opposite side of the head to facilitate connection of the head in fuel systems regardless of the line positions. In other embodiments the inlet and outlet may both be on the same side of the head or may be on opposite sides of the head. Regardless of what configuration is used, the ports not connected to a fuel line are plugged with conventional threaded plugs.

The filter head further includes a pump portion generally indicated 18. The pump portion is later described in detail and includes a manually actuated pump.

A filter/separator element 20 is shown attached to head 10. Element 20 is a "spin on" type element that includes a tap plate 22 which engages a central downward extending nipple portion or spud 24 of the head. The element is designed for separating impurities such as dirt particles and water, as the fuel flows through it.

Element 20 is adapted for inside-out flow and has a fluid in-flow area 26, which is an open cylindrical central area which receives fuel through a central opening in the spud 24. The fluid in-flow area 26 of the element is open at the bottom to the interior of a bowl 28. Water and other impurities that are separated from the fuel collect in the bowl. Bowl 28 includes a drain valve 30 for draining impurities that may be collected in the bowl. An electric heating element 32 is also mounted on the bowl and has a portion that extends upward into the in-flow area 26. The heater 32 serves to heat the fuel when the vehicle is operated in cold temperatures. The bowl 28 is held to the element by interengaging thread portions, generally indicated 34, on the bowl and element.

Fuel passing through the element 20 flows from the inflow area 26 radially outward through separator media 36. The filter/separator media is specifically adapted for removing water and other impurities. The media may be of several types which are known in the prior art.

After the fuel passes through the media, it is delivered to an out-flow area generally indicated 38. The out-flow area is bounded by the outside periphery of the media 36 and the inside of the cylindrical wall 40 of the element. Fuel in the out-flow area passes upward through openings 42 in the tap plate. The fuel passing upward out of the element is retained in the annular area above the element outside the spud by a circular resilient gasket 43 that extends between the element and the head. The fuel that has been treated by the element then passes through the head in a fluid passage (not shown) and is delivered out of the head through the outlet 16.

Although the first preferred form of the invention is used with a filter head adapted for receiving an element with "inside-out" flow, the invention may also be readily used with other types of elements including those which have "outside-in" flow.

The body 12 of the filter head also includes mounting holes 44. Mounting holes facilitate mounting the filter head at a suitable location on the vehicle.

Figure 3:
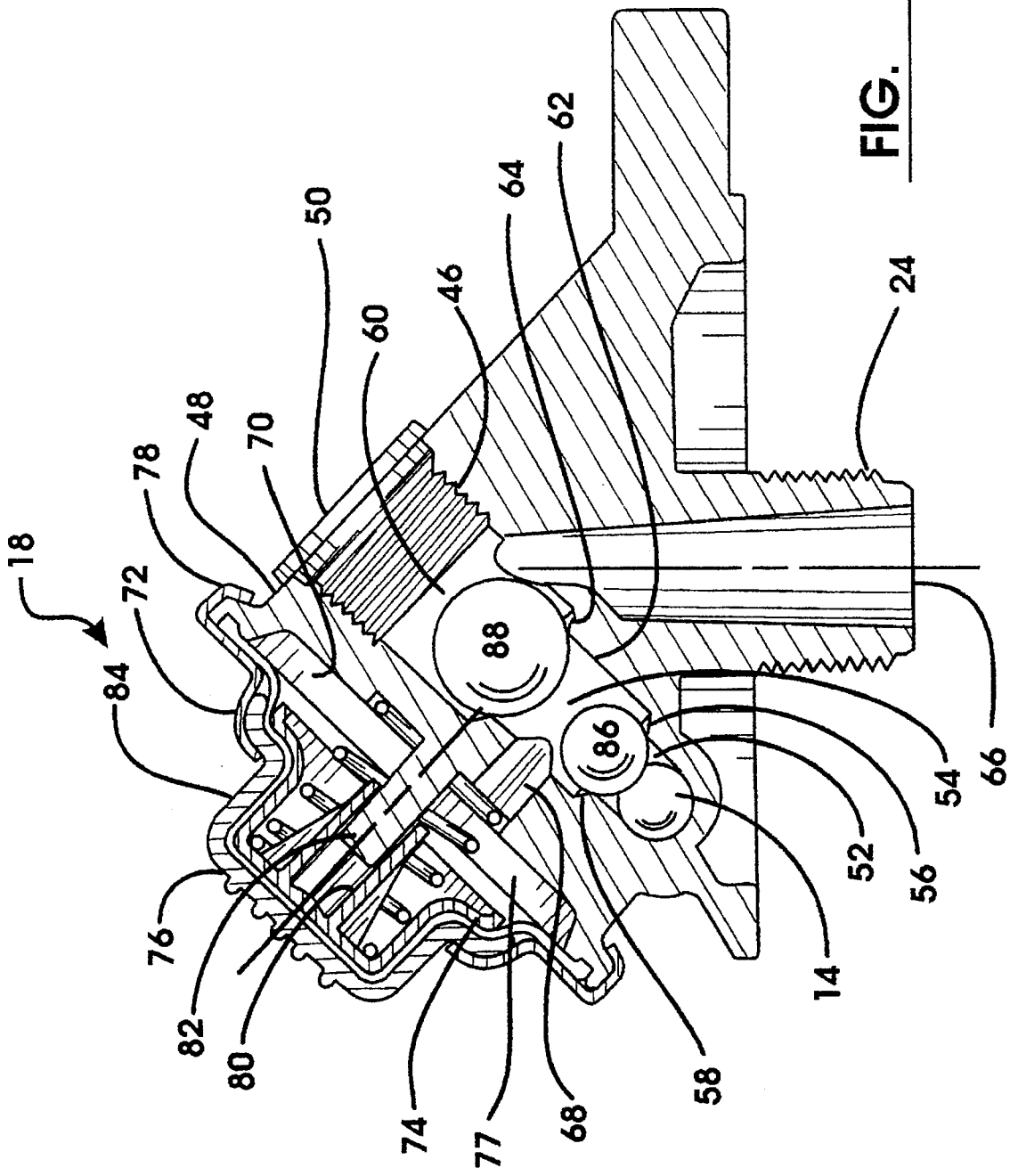
FIG. 3 is a cross sectional view of the filter head taken along line 3—3 in FIG. 2 with the head shown in a no-flow condition.

The filter head is shown in cross section in FIG. 3. The head includes a stepped axial bore 46. The bore extends in a downward direction from an opening (not separately shown) in an exterior wall 48 of the head. The opening is closed by a plug 50 which is threadably engaged in the bore.

The bore includes a first chamber or area designated 52. The first area 52 is of relatively small diameter and is in fluid communication with inlet 14 of the head. A second area 54 of larger diameter is positioned above first area 52. A first circular opening 56 extends between the first and second areas of the bore and enables flow of fuel therebetween. The first opening 56 is bounded by a circular, inwardly tapered seat 58.

A third area 60 of the bore 46 is positioned above second area 54. The third area 60 is of larger diameter than the second area. A second opening 62 extends between the second and third areas and enables fluid to flow therebetween. The second opening also has an inwardly tapered seat 64. Third area 60 is in fluid communication with a fluid passage 66 that extends through the center of spud 24 and delivers fuel to the fuel in-flow area of the element when the element is attached to the head.

The second area 54 is in fluid communication with a fluid passage 68. Passage 68 extends to a recess 70 in pump portion 18. Recess 70 is bounded by a flexible resilient generally circular diaphragm member 72. The diaphragm is supported internally by an interior support piece 74. The diaphragm 72 is supported externally by a cover member 76.

The cover member is held to the head by a retaining ring 78 which overlies the peripheral portions of the cover member. Retaining ring 78 also engages diaphragm 72 at its periphery and holds the diaphragm member in fluid tight relation with the recess 70. The diaphragm member and the recess bound a variable volume area of a pumping chamber, generally indicated 77.

Internal support piece 74 includes a sleeve 80 which is sized for slidably accepting a guide pin 82 which extends outward form the base of recess 70. A compression spring 84 biases interior support piece 74 and the diaphragm member 72 outward.

A first body 86 is positioned in bore 46. Body 86 is sized for acceptance by first seat 58 and for blocking first opening 56 when the body 86 is adjacent thereto. Body 86 is made of a rubber material that has a density greater than the fuel passing through the head so that it will not tend to float therein. The downward angle of bore 46 biases body 86 into engagement with the seat due to gravity.

A second body 88 is positioned in bore 46. Second body 88 is made of the same material as body 86, but is larger in diameter. Body 88 is adapted for engaging second seat 64 and for blocking second opening 62 when the body 86 is adjacent thereto.

In operation of filter head 10, the head is in a no-flow condition when the engine of the vehicle is shut off and no fuel is flowing thereto. This is the condition of the head at the time an element change is made. In this condition, both bodies 86 and 88 are positioned downward against their associated seats 58 and 64 respectively, as shown in FIG. 3.

Figure 4:
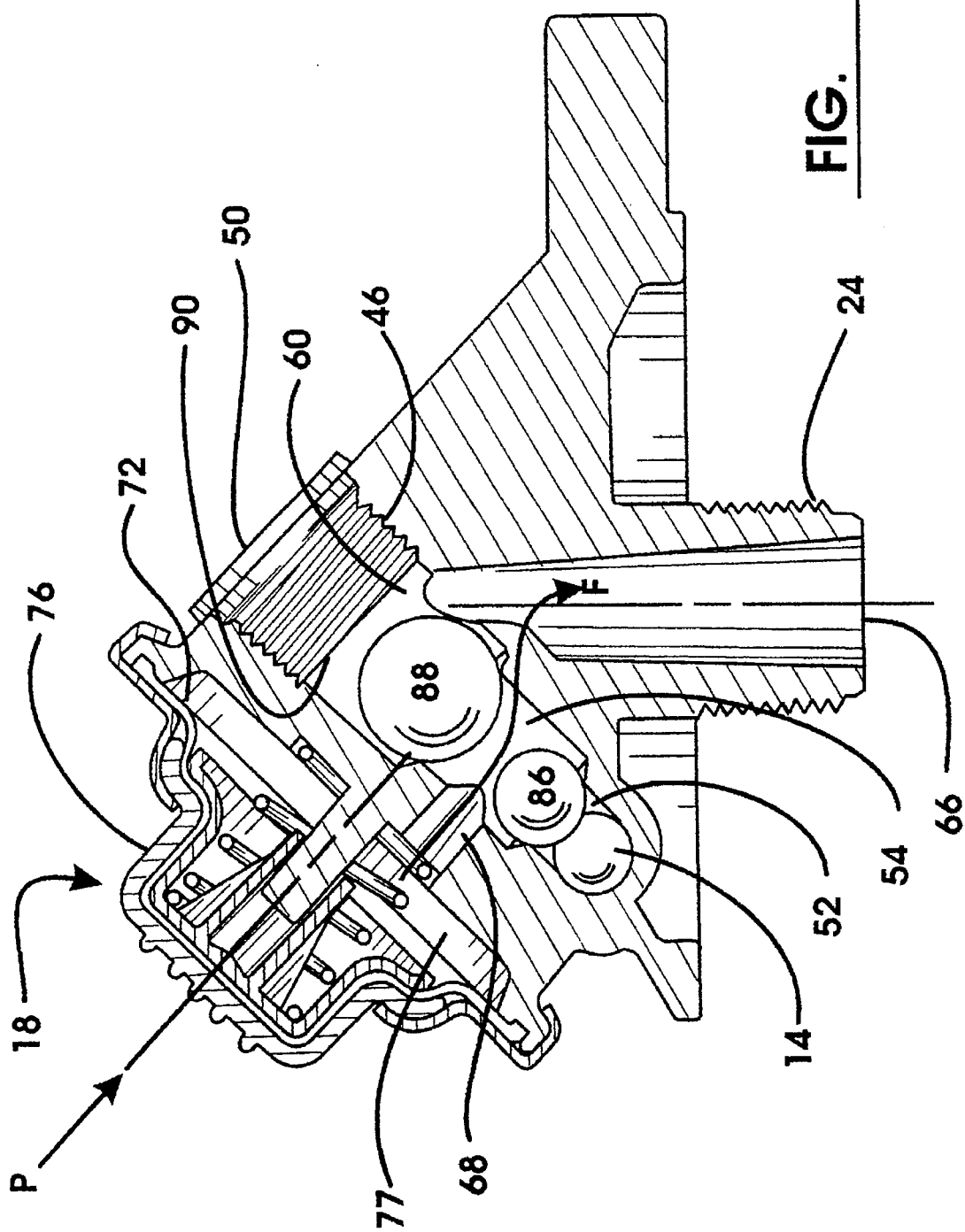
FIG. 4 is a cross sectional view of the filter head shown in FIG. 3 with the pump portion undergoing an output stroke.

After the new element has been installed, it has an air pocket that must be removed. To remove the air, cover member 76 of the pump portion 18 is pushed downward in the direction of arrow P in FIG. 4. The depression of cover member 76 deforms diaphragm 72 which decreases the volume of pumping chamber 77. This creates fluid pressure which is transmitted to the second area 54 of the bore through fluid passage 68.

The increase in pressure in second area of 54 pushes body 86 downward against the seat and prevents flow from the second area to the first area 52. The pressure in the second area further pushes body 88 upward off its seat. The pressure pushes fuel out of the second and third areas in to passage 66 of spud 24, as indicated by arrow F. Body 88 is displaced upward until it is held by engagement with an inner face 90 of plug 50. Once the pressure generated in the pumping chamber is dissipated, body 88 falls back downward into engagement with its seat.

Figure 5:
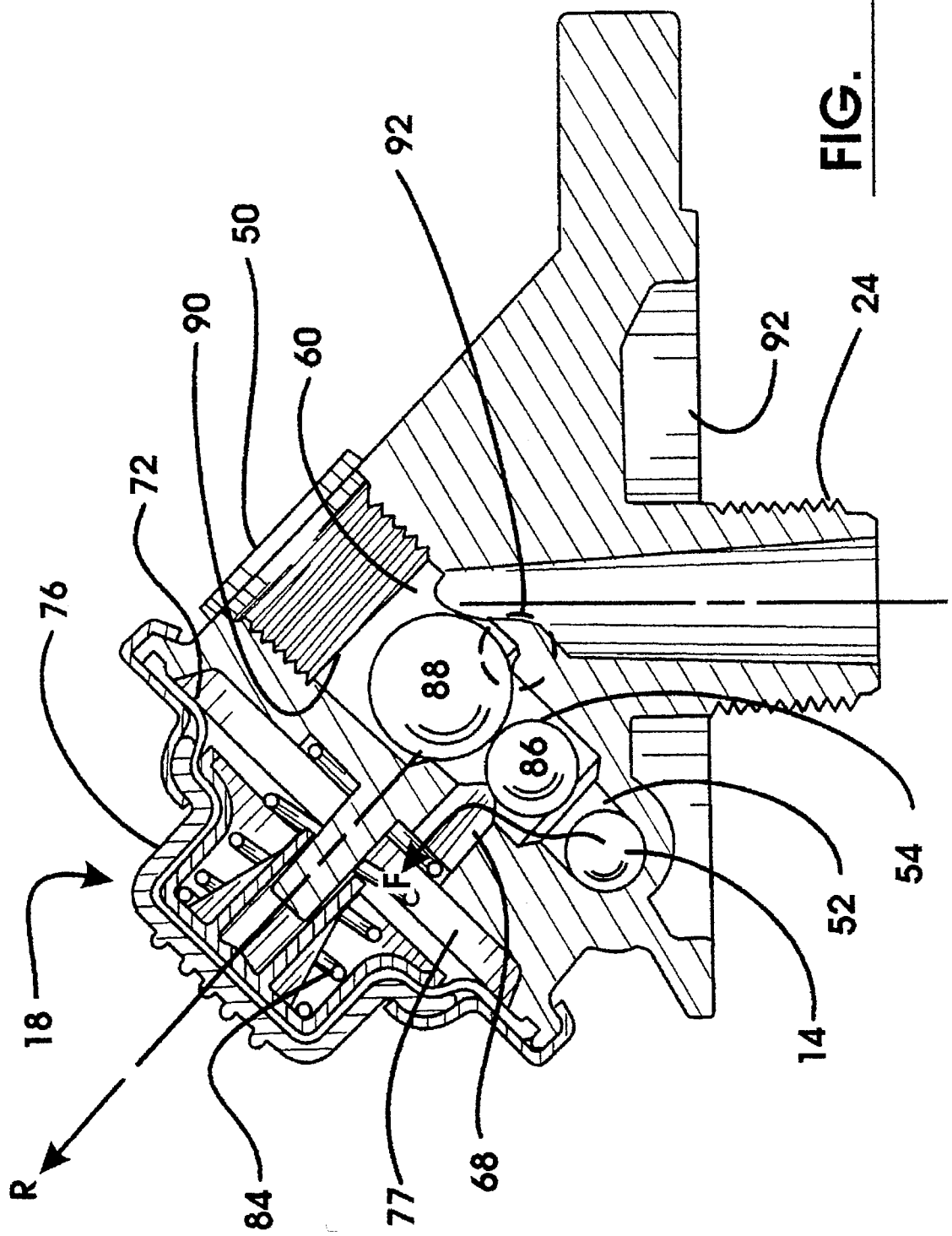
FIG. 5 is a cross sectional view of the head with the pump portion undergoing an intake stroke.

Releasing cover 76 of the pumping portion 18 of the head causes cover 76 and the diaphragm member 72 to move outward in the direction of arrow R in FIG. 5 due to the force of spring 84. As diaphragm member 72 returns to its original condition, the volume of chamber 77 increases. As the volume of chamber 77 expands, it draws a vacuum in second area 54 of the bore. The vacuum in the second area holds body 88 downward against its seat. At the same time body 86 is pulled upward off its seat until it abuts body 88. The vacuum draws fuel from the inlet 14 through the first chamber 52, and into the second chamber 54 and the pumping chamber 77. The in-flow of fuel is indicated by arrow F in FIG. 5.

Once the fuel has been drawn in by the vacuum and the pressure equalizes, both bodies 86 and 88 return to their seats and are in the positions shown in FIG. 3. The cover 76 of the pump is repeatedly pushed and released, drawing fuel from the inlet and delivering it to the fluid in-flow area of the element through the areas of the axial bore.

The priming process which delivers fuel to the element, forces the air that was originally into the element when it was attached to the head, into the fluid out-flow area of the element and toward the outlet in the head. The displaced air passes from the element into an area 92 located annularly around the spud in the filter head. The air then passes through a fluid passage in the head (not shown) and to the outlet 16 which is shown in phantom in FIG. 5. The pumping action is repeated until the air is forced out of the head and down the fuel line to an area where it will not impair operation of the fuel system.

In other embodiments of the invention, area 92 of the filter head may be in connection with a vent having a construction which is well known in the prior art. The vent enables air to escape from the filter head, but prevents the escape of liquid. A vent may be used to avoid having to push the air long distances down the fuel line from the filter head or can be used in circumstances in which the fuel system cannot readily tolerate air in the fuel lines.

Figure 6:
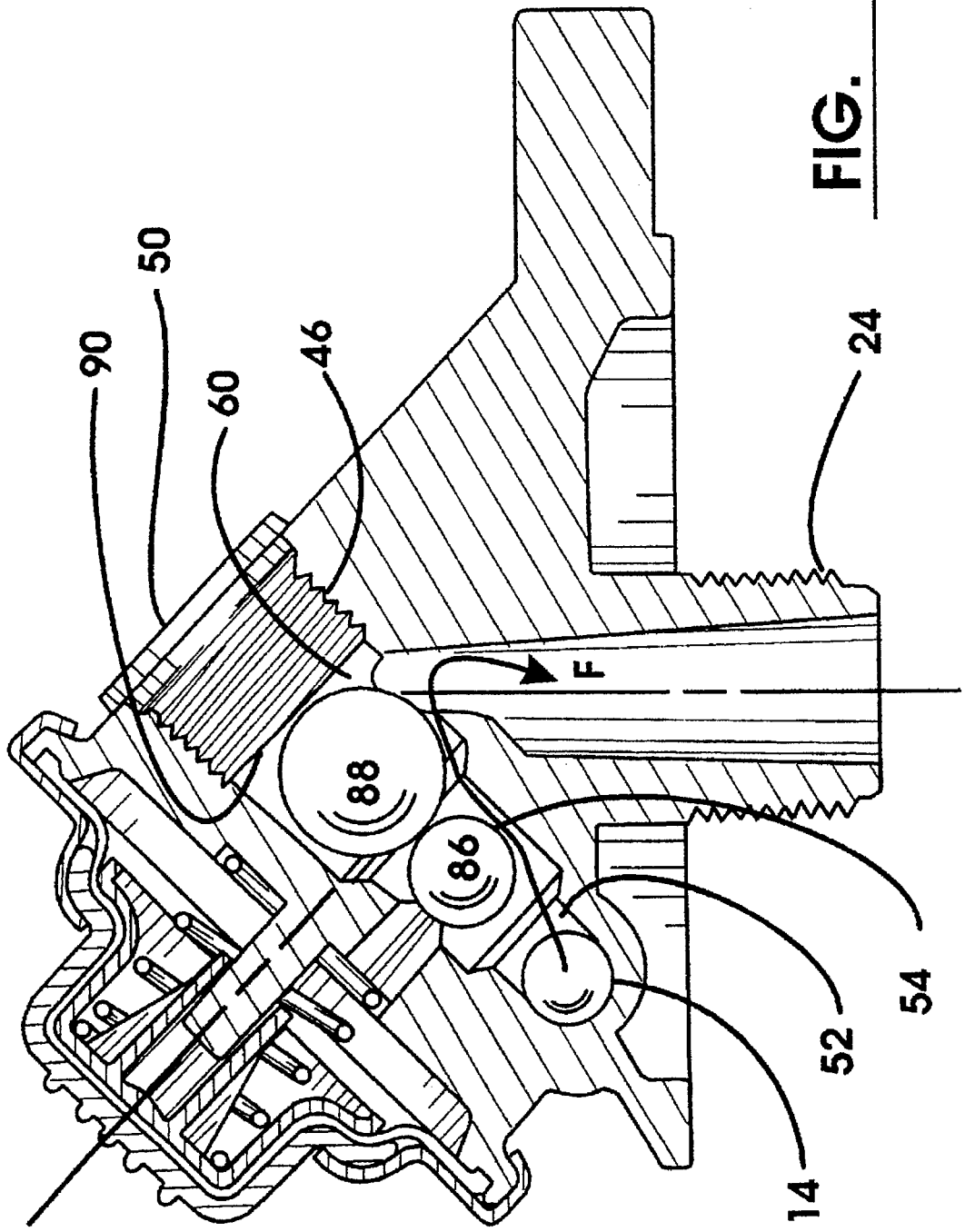
FIG. 6 is a cross sectional view of the filter head shown with fuel flowing through the head in a normal vehicle running condition.

Once the air is removed, the engine may be started. If fuel is drawn through the element and filter head by vacuum, the incoming fuel will pass into the inlet 14 of the head and upward through the areas of bore 46. The fuel flow will cause bodies 86 and 88 to be lifted from their respective seats as shown in FIG. 6. This enables fuel to flow in the annular clearances between the bodies and the walls of the bore. The bodies are sized such that they provide a relatively large flow area between the periphery of the bodies and the bore so that restriction to flow is minimized.

In the preferred embodiments of the invention, the bodies are sized so that body 88 abuts the inner wall 90 of plug 50 and body 86 abuts body 88. As a result, in the running condition the bodies are positioned to prevent significant restriction to flow. Of course, in other embodiments of the invention, bodies of different shapes and sizes may be used.

The spherical character of bodies 86 and 88 also makes them inherently self-cleaning. This avoids the collection of impurities on the bodies which could impair their function as part of check valve means. The filter head of the present invention is also constructed so that it functions equally well in systems where the head is positioned on the downstream side of a fuel pump and fuel is pushed into the inlet by pressure rather than drawn through by vacuum.

A further significant advantage of the filter head of the present invention is its reduced cost of manufacture. The multi-stepped bore may be readily molded or machined in the head. This construction eliminates the need for multiple separate chambers and fluid passages which are required in other designs. Further, the bodies 86 and 88 which serve as part of check valve means may be installed by simply dropping them into the bore before it is closed by plug 50 during the assembly operation. This is much less costly than installing other types of check valve systems. Further, if a problem should develop with the bodies due to accumulations of impurities or other problems, cleaning or repair may be readily accomplished by removal of plug 50.

In the first preferred embodiment of the invention the bore 46 extends downward at a 45 degree angle. In other embodiments other downwardly directed bores may be used. Further, other embodiments of the invention may include biasing means such as springs for biasing the bodies against their associated seats, so that the bore may extend in other orientations.

Figure 7:
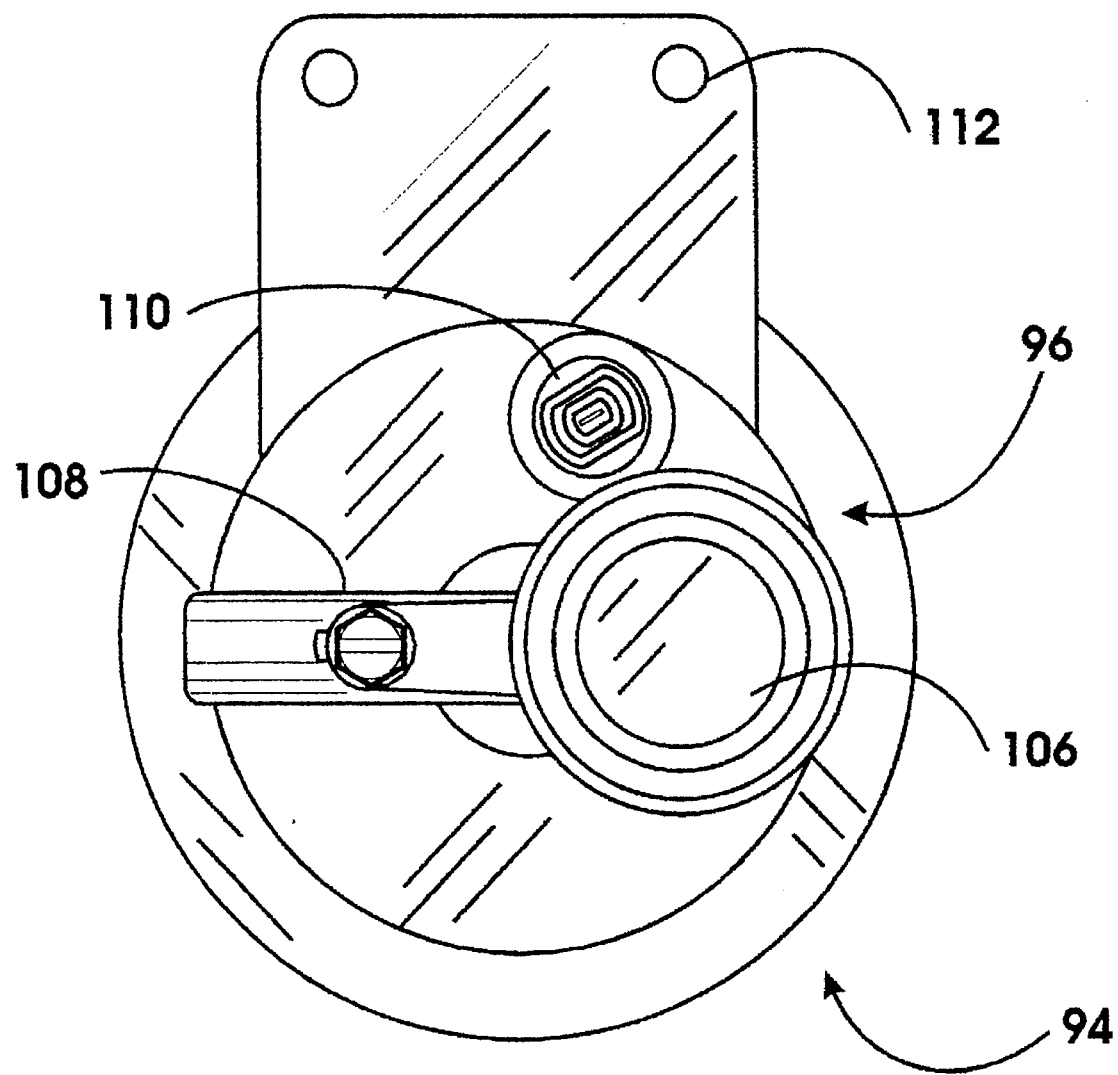
FIG. 7 is a top plan view of an alternative embodiment of a filter head and priming pump.

An alternative embodiment fuel filter generally indicated 94 is shown in FIGS. 7 through 9. Filter 94 includes a head 96 and a detachable element 98 like the previously described embodiment. The head includes an inlet 100 and an outlet 102. The head also includes a pumping portion 104 which includes a movable pump cap 106. The head further includes a vent opening (not shown) which in operation is generally closed by a removable vent plug 108. The vent plug serves the function previously described of enabling air to escape from the element during a priming operation. As will be later discussed, filter 94 is particularly well suited for use in fuel systems in which it is undesirable to allow air to enter the fuel system during a filter element change.

The head 96 also includes an electrical connector 110 for connection to a fuel heater inside the head. The filter head further includes mounting holes 112 to facilitate mounting the filter head on a vehicle.

Element 98 which will be later described in detail is a filter/separator element. It has a removable bottom cap 114, a drain valve 116 and an electrical connector 118 for a water sensor extending from bottom cap 114.

Figure 12:
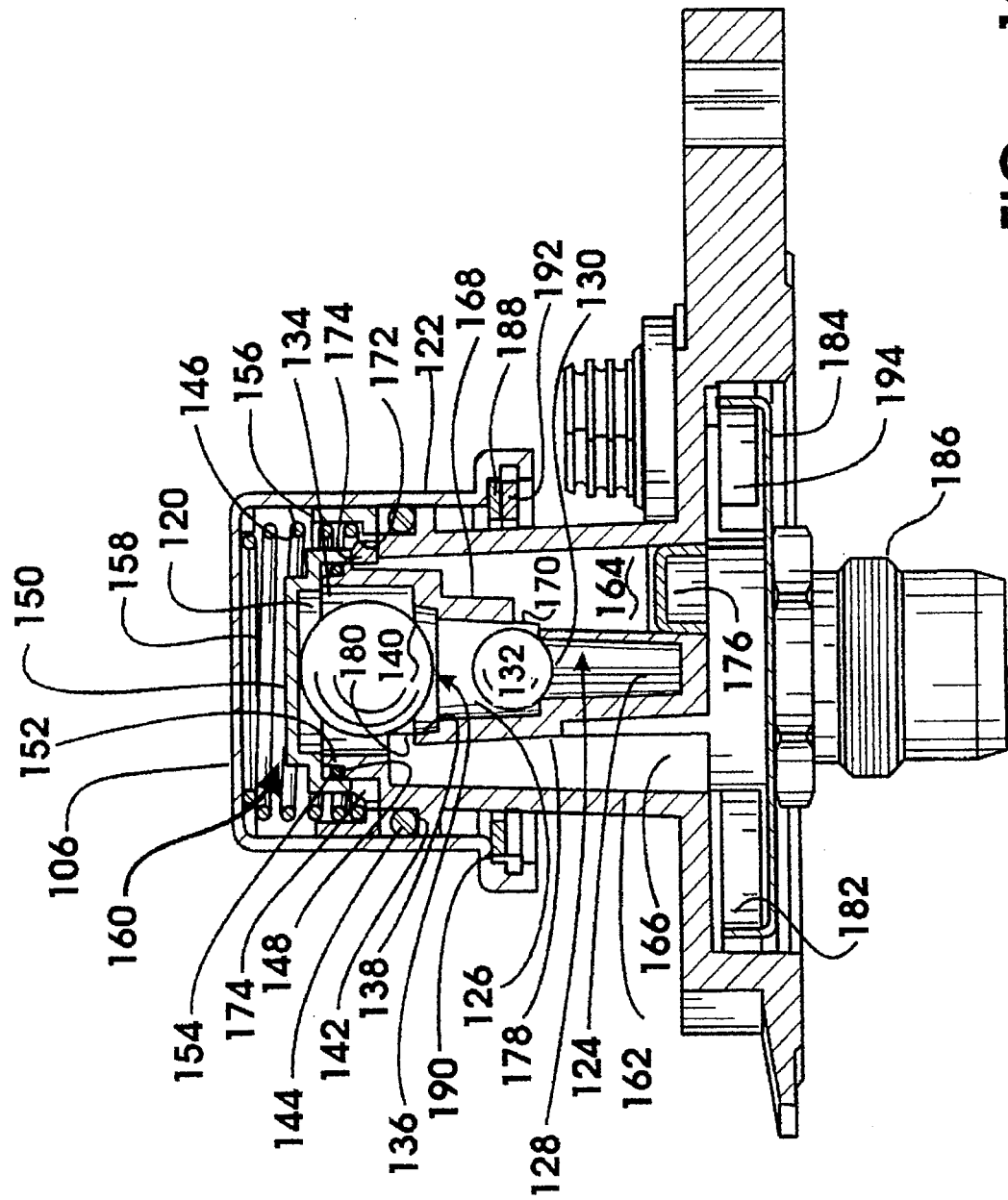
FIG. 12 is a sectional view of the filter head along lines 12—12 in FIG. 11 with the pump portion shown undergoing an output stroke.
Figure 13:
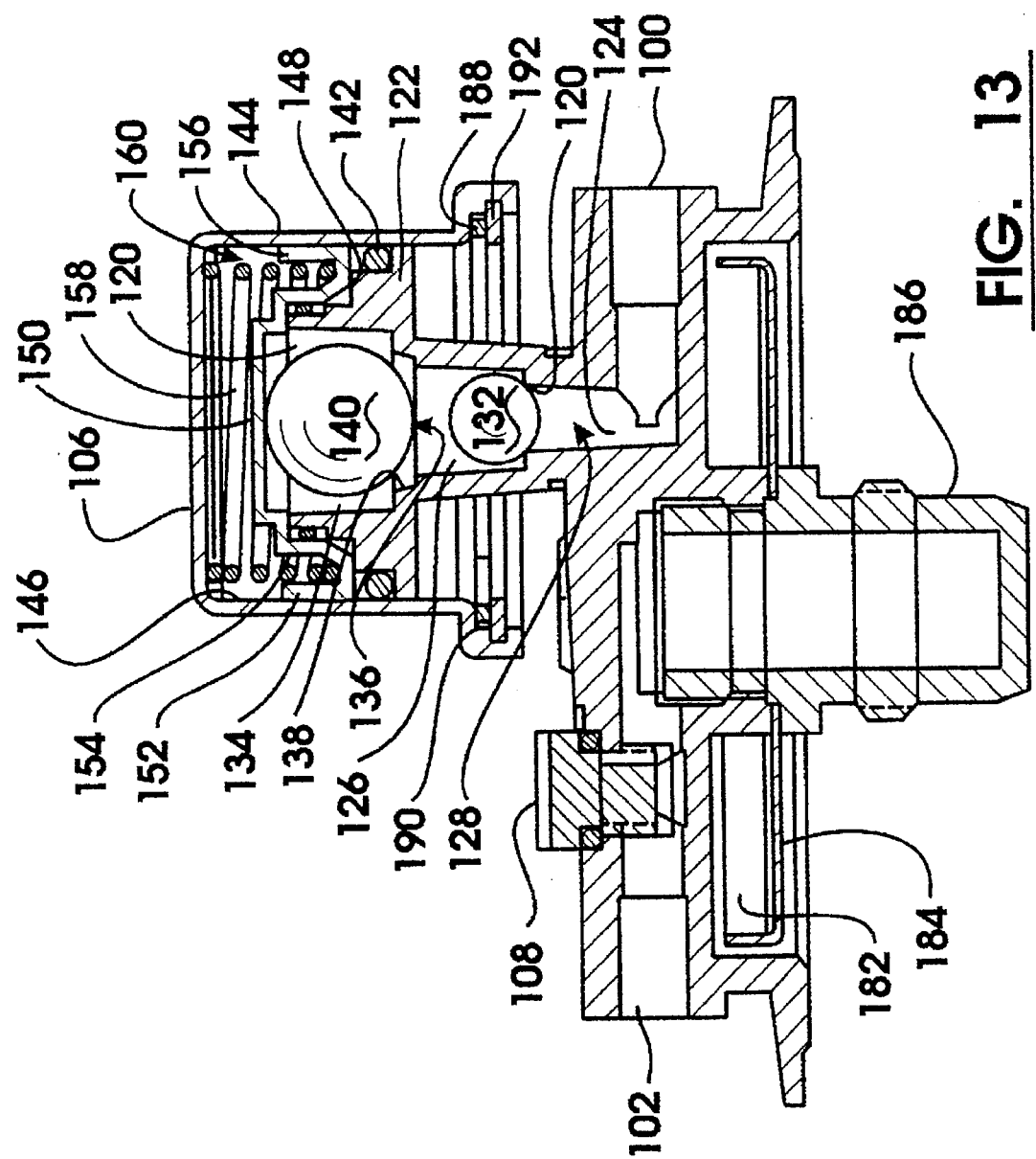
FIG. 13 is a sectional view of the filter head in the output stroke condition of the pump portion along line 13—13 in FIG. 11.

The head 96 and pumping portion 104 are shown in greater detail in FIGS. 10 through 15. As best shown in FIGS. 12 and 13, the pumping portion 104 has an internal upright extending bore 120. The bore 120 is formed integrally with the head and in the operative condition extends upward thereon. The bore is bounded at its outer end by an annular stepped projection 122.

The bore 120 has a first area 124 in fluid communication with inlet 100 (see FIG. 13). Like the previously described embodiment, the bore 120 also has a second area 126 which is shown disposed vertically above the first area 124. An opening 128 extends between the first and second areas and is bounded by a first seat 130. A first body 132 is movably positioned in the second area above the first seat. Body 132 is sized for acceptance in first seat 132.

Bore 120 further includes a third area 134 shown vertically above the second area 126. A second opening 136 extends between the second and third areas and is bounded by a tapered second seat 138. A second body 140 is movably positioned in the third area and is sized for acceptance in the second seat 138. First and second bodies 132, 140 are preferably comprised of rubber material similar to bodies 86 and 88 of the previously described embodiment.

Stepped annular projection 122 has a first step 142 which supports an annular resilient first seal 144. Seal 144 engages a cylindrical inner cap wall 146 of pump cap 106 in fluid tight relation.

Annular projection 122 further includes a second annular step 148 thereon. Second annular step 148 supports a closure disk member 150 thereon. Closure disk member 150 serves to close the open top end of bore 120. Stepped projection 122 further includes a third annular step 152 which supports a second seal 154 thereon. Seal 154 prevents fluid from escaping from the bore underneath the closure disk member.

The closure disk member 150 further includes an outer annular flange portion 156 which engages inner wall 146 of the pump cap 106 in slidable abutting relation. The flange portion 156 further serves as a centering nest for a compression spring 158 which extends between the disk shaped member 150 and the inside top surface of pump cap 106.

The seal 144 supported by the stepped projection 122 bounds a variable volume area generally indicated 160 in the interior of pump cap 106. When pump cap 106 is moved longitudinally downward, the volume of the pump cap above the stepped projection decreases and pressure rises in area 160. Returning movement in the upward direction of the pump cap creates a vacuum in area 160.

Figure 10:
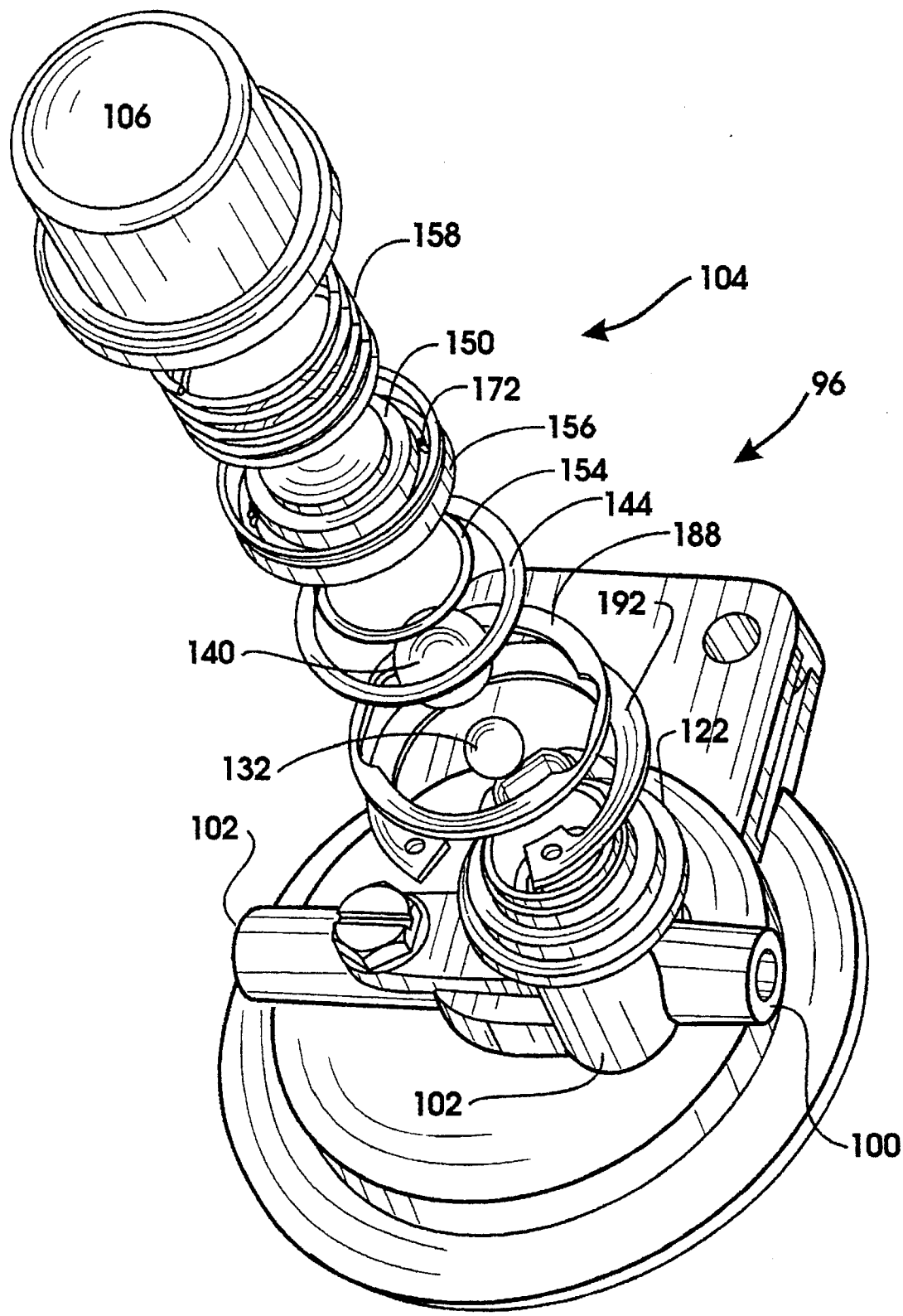
FIG. 10 is an isometric exploded view of the filter head and priming pump shown in FIG. 7.
Figure 11:
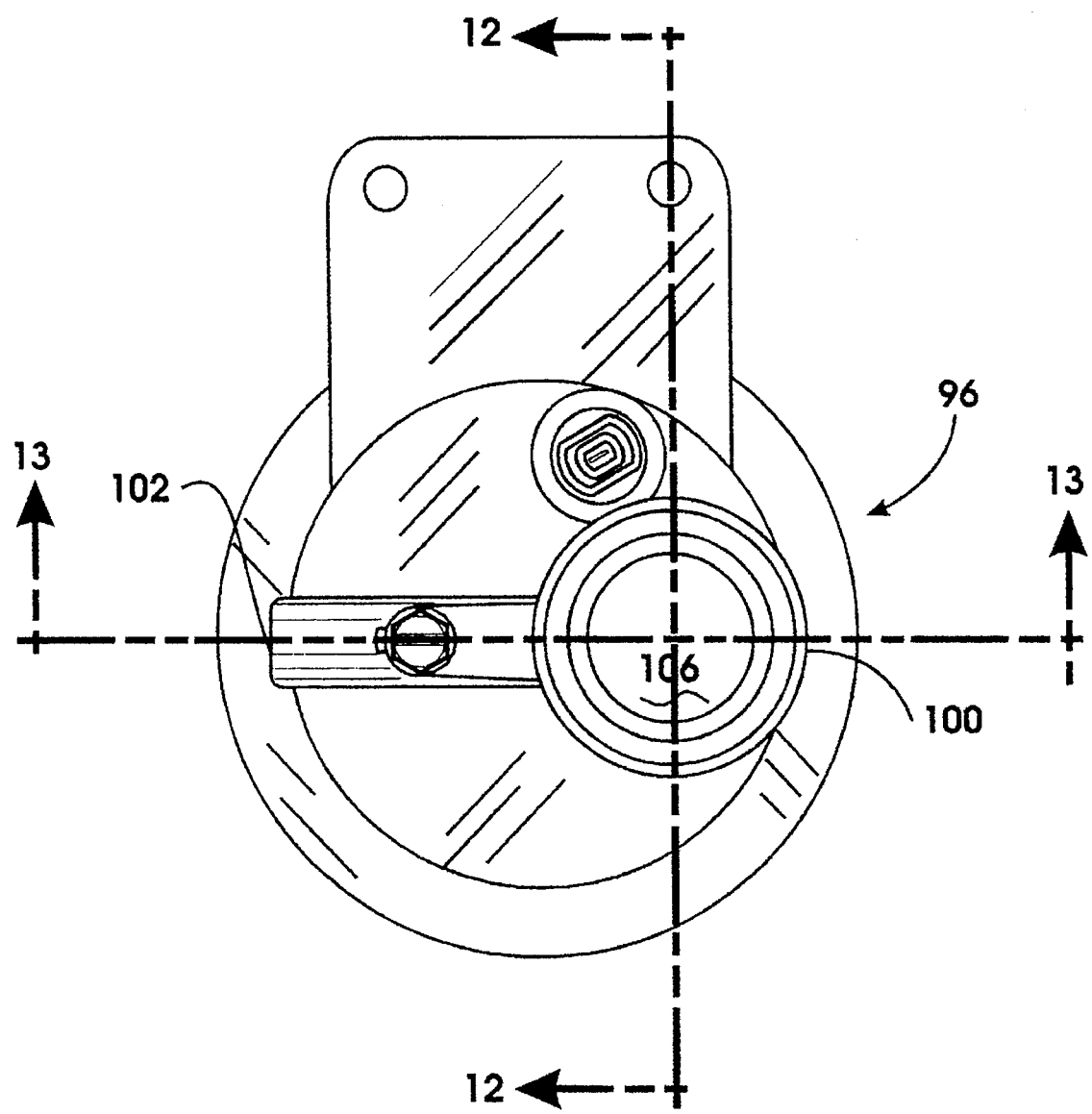
FIG. 11 is an enlarged top plan view of the filter head shown in FIG. 7.

A split sleeve 162 extends in surrounding relation of bore 120 at the sides thereof (see FIGS. 10 and 12). The sleeve bounds a first chamber 164 on a first longitudinal side of the bore 120. On an opposed side, the sleeve 162 bounds a second chamber 166. The bore is bounded in the first chamber 164 by a wall 168. Wall 168 has an opening 170 therethrough longitudinally above first seat 130. As a result, second area 126 of the bore is in fluid communication with first chamber 164.

First chamber 164 is also fluidly open through a cutout 172 adjacent annular second step 148 of stepped projection 122. The cutout 172 is open to variable volume area 160 through a pair of opposed openings 174 in the inside lower surface of closure disk member 150.

First chamber 164 is closed at its lower end by a knockout plug 176. The opening closed by the knockout plug is used during manufacture to facilitate forming the chamber.

First chamber 164 is in fluid tight communication with the variable volume area 160 inside the pump cap 106. Further, first chamber 164 is in fluid communication with the second area 126 of the bore.

Second chamber 166, on the opposed side of the bore from first chamber 164, extends between the inside of the sleeve wall 162 and a wall 178 which bounds the bore 120. Second chamber 166 is open to the third area 134 of the bore through a cutout 180 above second seat 138.

Second chamber 166 is open at the bottom thereof into an annularly extending heater chamber 182. Heater chamber 182 is bounded by a dish shaped member 184 which has PTC type heating elements mounted thereto. The dish shaped member 184 is supported on a nipple portion 186 which is threadably engaged with the head and is also threadably engagable with the element 98 as later discussed in detail.

The pump cap 106 is made of relatively rigid plastic material. It is held to the head by a support ring 188 which engages an outward extending annular flange 190 inside the cap. The support ring is held against flange 190 by a snap ring 192 which nests in an annular recess in the cap. The support ring is adapted to engage the lower face of projection 122 when the pump cap is in its upward position (see FIGS. 14 and 15). The engagement of the support ring with the lower face of projection 122 prevents the pump cap from disengaging from the head.

The operation of the priming pump of the second embodiment is similar to that of the first embodiment. Pumping action is initiated by alternately depressing and releasing pump cap 106. When cap 106 is depressed, as shown in FIGS. 12 and 13, the pressure generated inside the cap by the decrease in volume of the variable volume area 160 is transmitted to the first chamber 164 through the openings 174 in the closure disk member 150 and the cutout 172 at the top of first chamber 164. This increased pressure is transmitted to the second area 126 inside bore 120 through opening 170. Because the diameter of the bore in the second area is greater than the diameter of body 132, the pressure passes upwardly around the body 132 which remains seated blocking fluid flow into first area 124.

The increase in pressure in the second area pushes second body 140 upward off the second seat 138. As a result, any fluid in the second area is pushed upward through the third area 134 and out through cutout 180 into second chamber 166. In chamber 166 the fuel flows downward into heater chamber 182. In the heater chamber the fuel may be heated if the heater is operating. However, regardless of whether the fuel is heated, the fuel flows through the heating chamber upward over the lip of the dish shaped member 184 and through opening 194. As will be later explained, once the fuel has passed out of the heater it flows to a peripheral chamber of the filter element.

It should be noted that in its upward position, body 140 engages the inside of closure disk member 150. This insures that the body does not move to a position wherein it will not readily fall back into its seated position when the pressure is dissipated.

Figure 14:
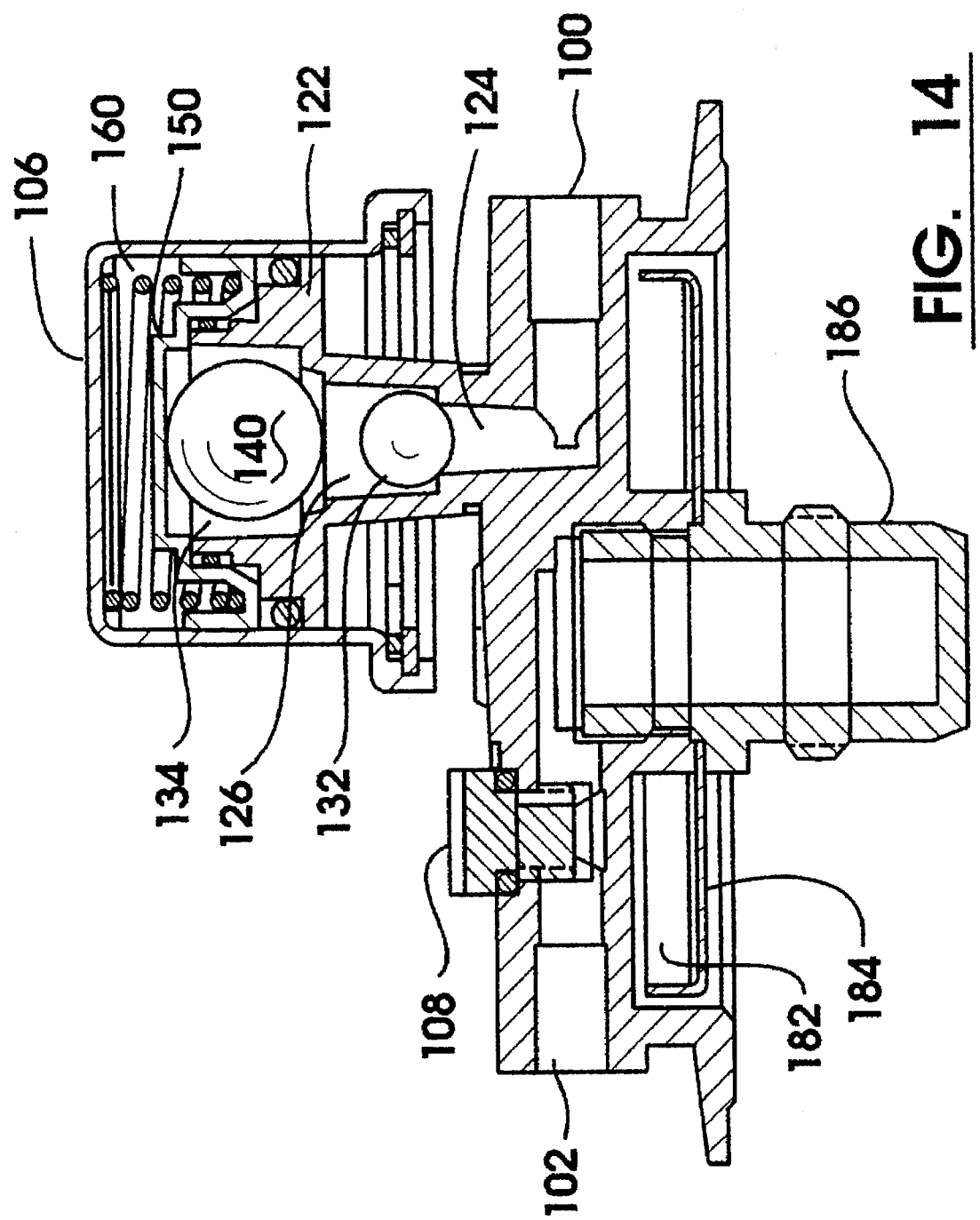
FIG. 14 is a sectional view similar to FIG. 12 except that the pump portion is shown undergoing an intake stroke.
Figure 15:
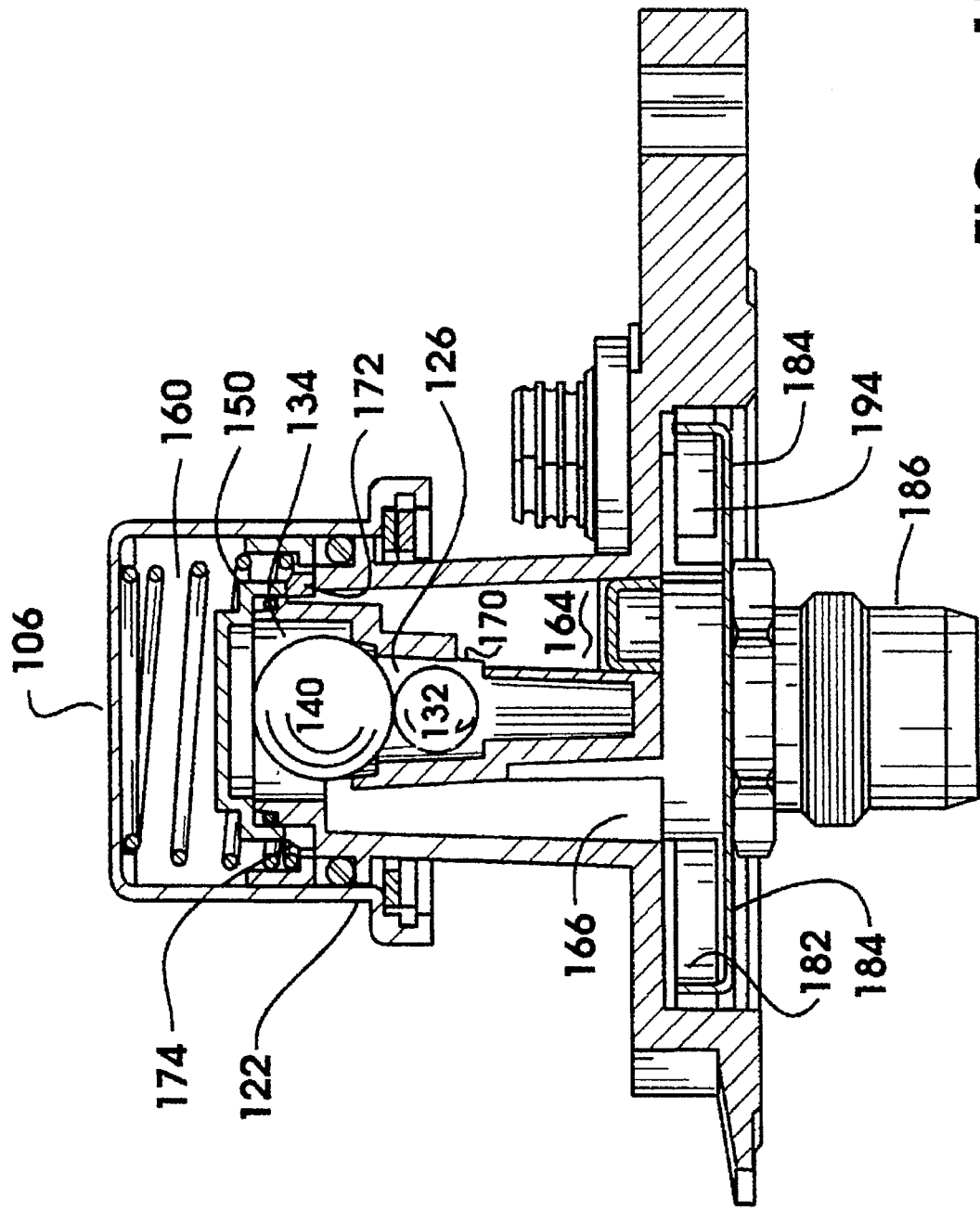
FIG. 15 is a sectional view similar to FIG. 13 except the pump portion is shown undergoing an intake stroke.

When pump cap 106 is released from its lower position, it is moved upward by the force of spring 158 to the position shown in FIGS. 14 and 15. This upward movement increases the volume of chamber 160 inside the cap and creates a vacuum. The vacuum is transmitted to first chamber 164 through cutout 172 and the openings 174 in the closure disk member 150. The vacuum is transmitted to the second area 126 at the bore 120 through opening 170. The vacuum moves body 132 upward off its seat. In this condition the body 140 remains seated due to the vacuum force on its lower side. Upward movement of body 132 is restricted by its engagement with body 140. This insures that body 132 will return to its seat when the vacuum is dissipated.

The vacuum applied to second area 126 pulls fuel into the second area from the first area 124 and the inlet 100. When the vacuum is dissipated the pump is again depressed to repeat the cycle.

In some systems, when there has been an element change the vent plug 108 is removed and the priming pump cycled until the new element is filled with fuel and all air in the new element has been displaced and pushed out the vent opening. Thereafter the vent plug is reinstalled. This minimizes the amount of air that may enter the system and avoids possible problems with restarting the engine after a filter change.

When the filter is primed the engine may be started. In this condition both bodies 132,140 are disposed upward from their respective seats to enable fuel flow through the bore. The bodies are also sized and configured to engage one another in the manner of the bodies shown in FIG. 6.

Figure 16:
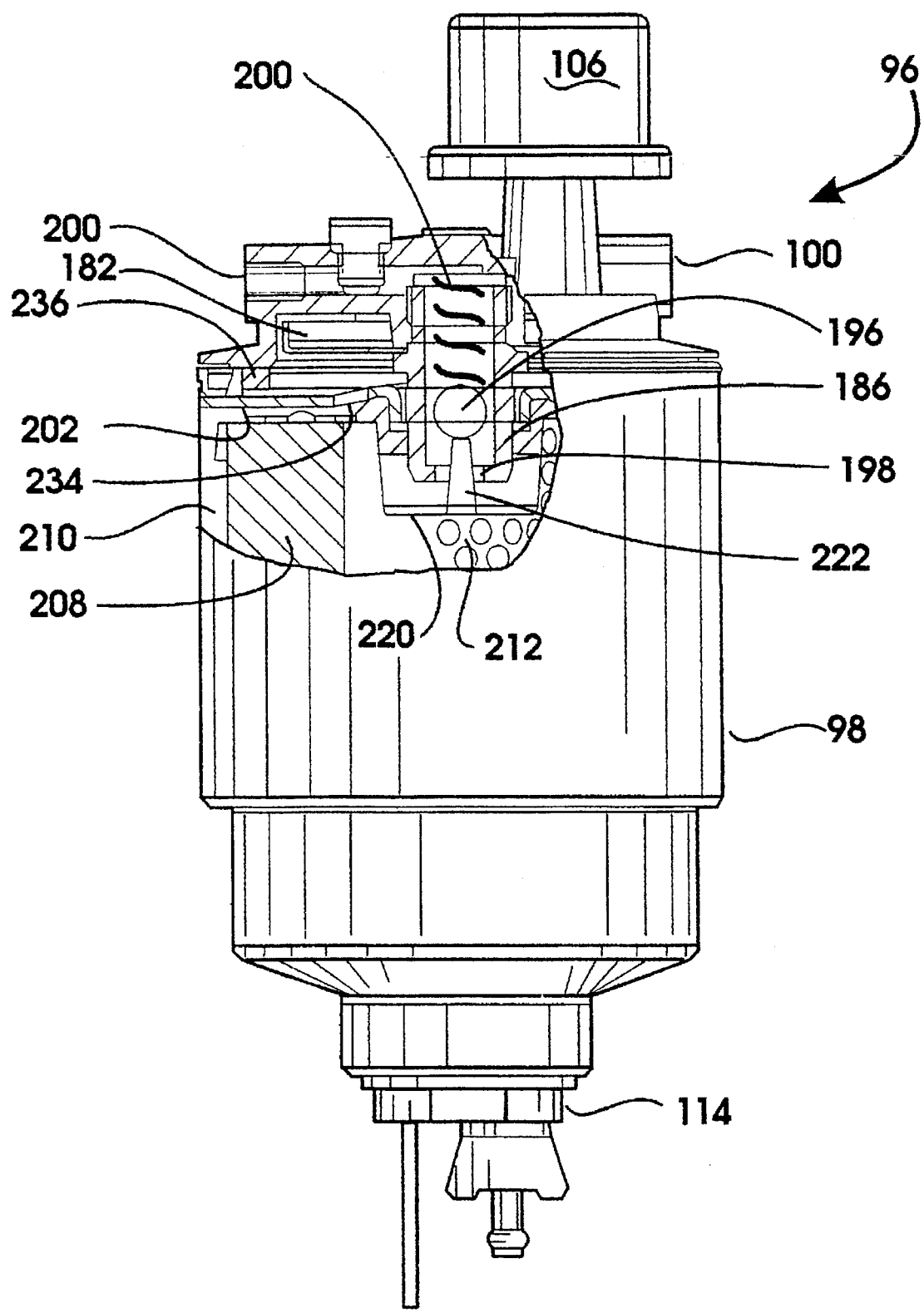
FIG. 16 is a partial cutaway view of the filter head and element assembly of FIG. 8.
Figure 17:
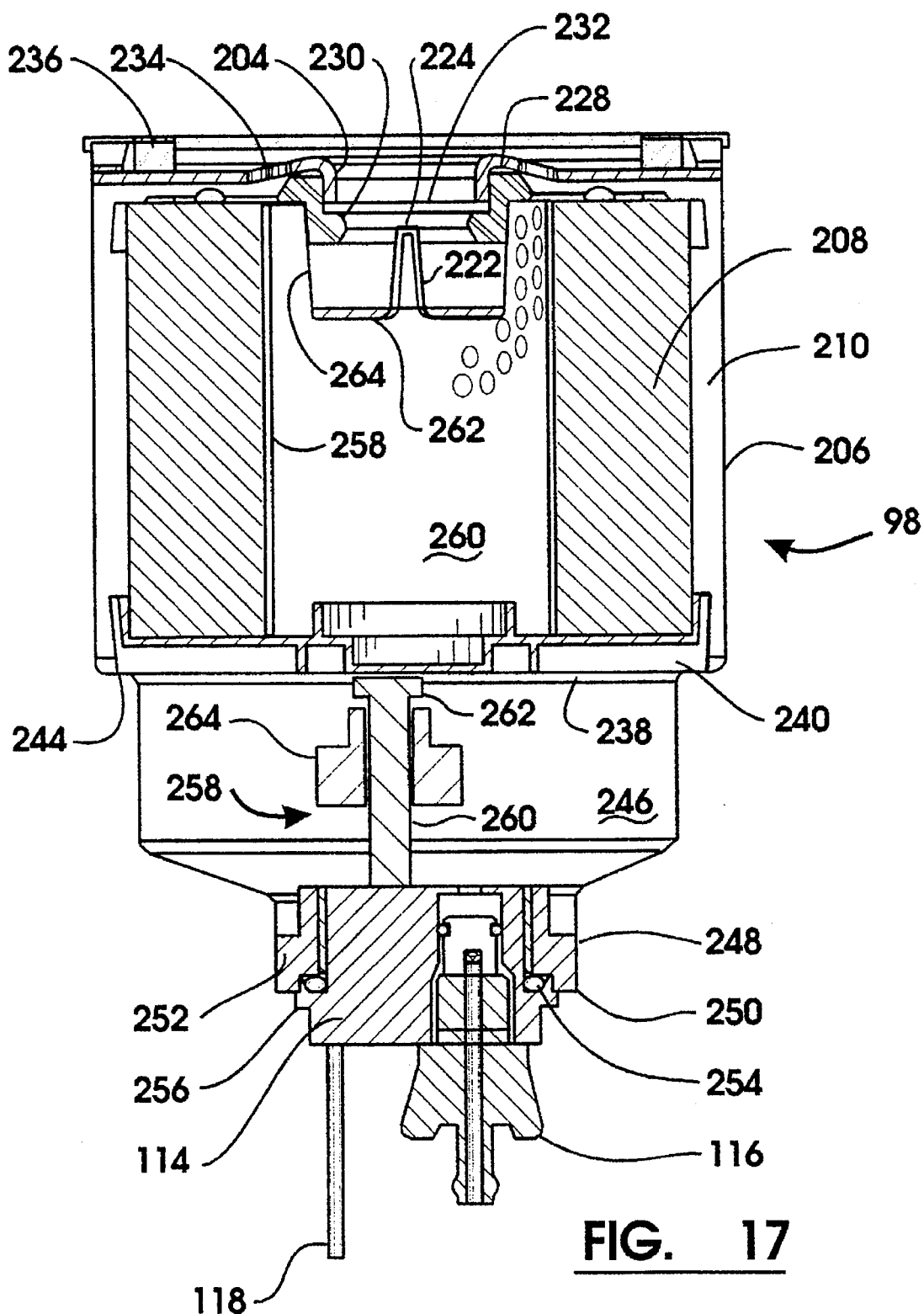
FIG. 17 is a cross sectional view of the filter element of FIG. 16.
Figure 18:
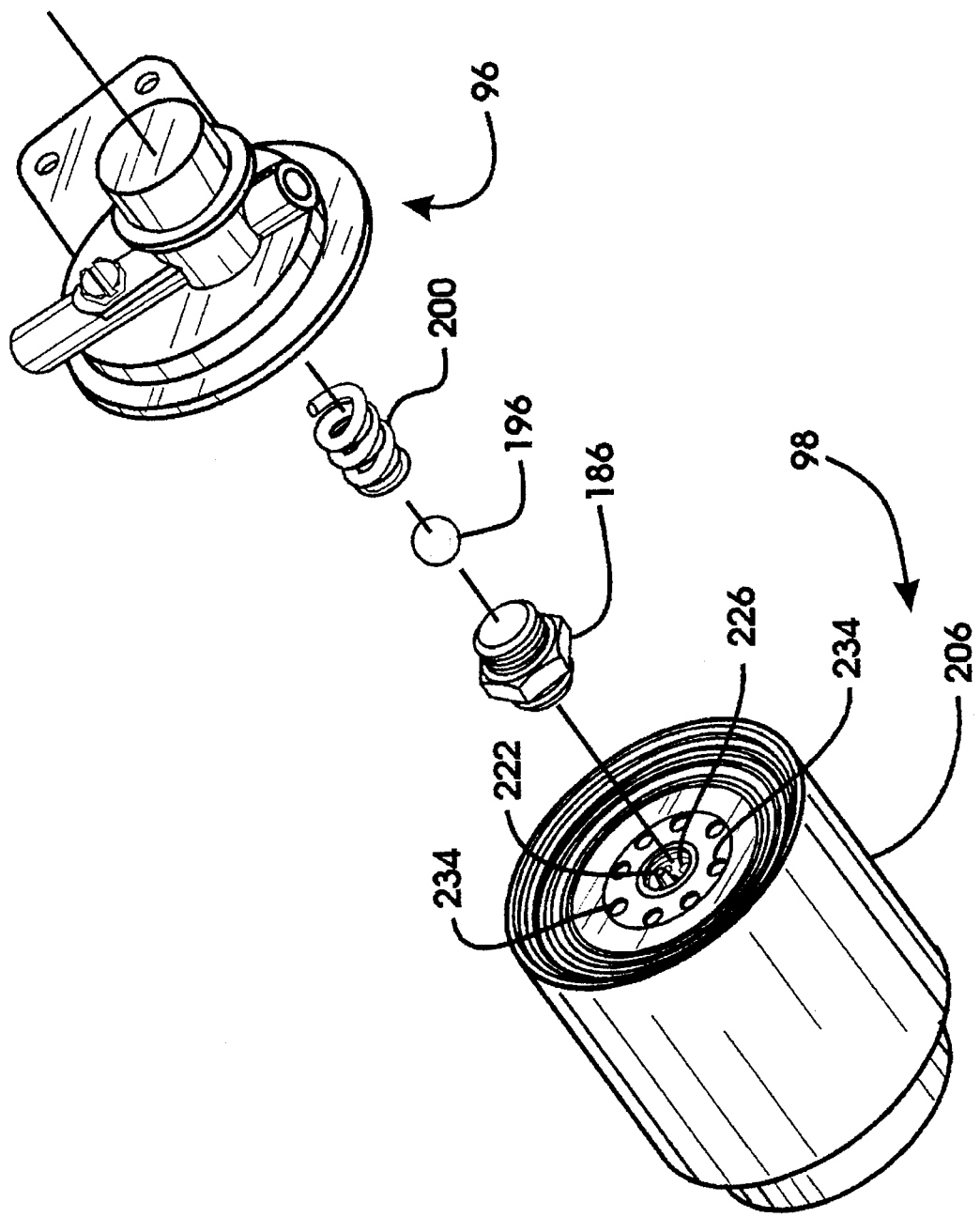
FIG. 18 is an isometric exploded view of the head, nipple portion, valve element, and filter element shown in FIG. 16.

The filter element 98 and the head 96 are shown in greater detail in FIGS. 16 through 18. The nipple portion 186 includes a valve element 196 that is movable therein. The valve element is adapted for blocking an opening 198 at the lower end of the nipple portion. A spring 200 biases the valve element 196 towards the closed position in which it shuts off flow through the nipple portion.

The filter element 98 includes a tap plate 202 at a first end thereof. The tap plate has a central threaded opening 204 which threadably engages an enlarged threaded area of nipple portion 186. As shown in FIG. 17, the element includes an outer generally cylindrical housing 206. The housing encloses an annular ring of filter media 208. The media 208 removes impurities from fuel passing therethrough. The media separates a peripheral fuel chamber 210 from a central fuel chamber 212 inside the media. The inner face of the media is supported by a perforated center tube 214.

Media 208 is attached at a first longitudinal end to a first end cap 216. The media is attached to the first end cap by potting compound or similar adhesive material. The first end cap includes a longitudinally extending annular wall 218 in the central fuel chamber. Annular wall 218 is radially disposed inwardly from the center tube 214 of the media 208.

Figure 19:
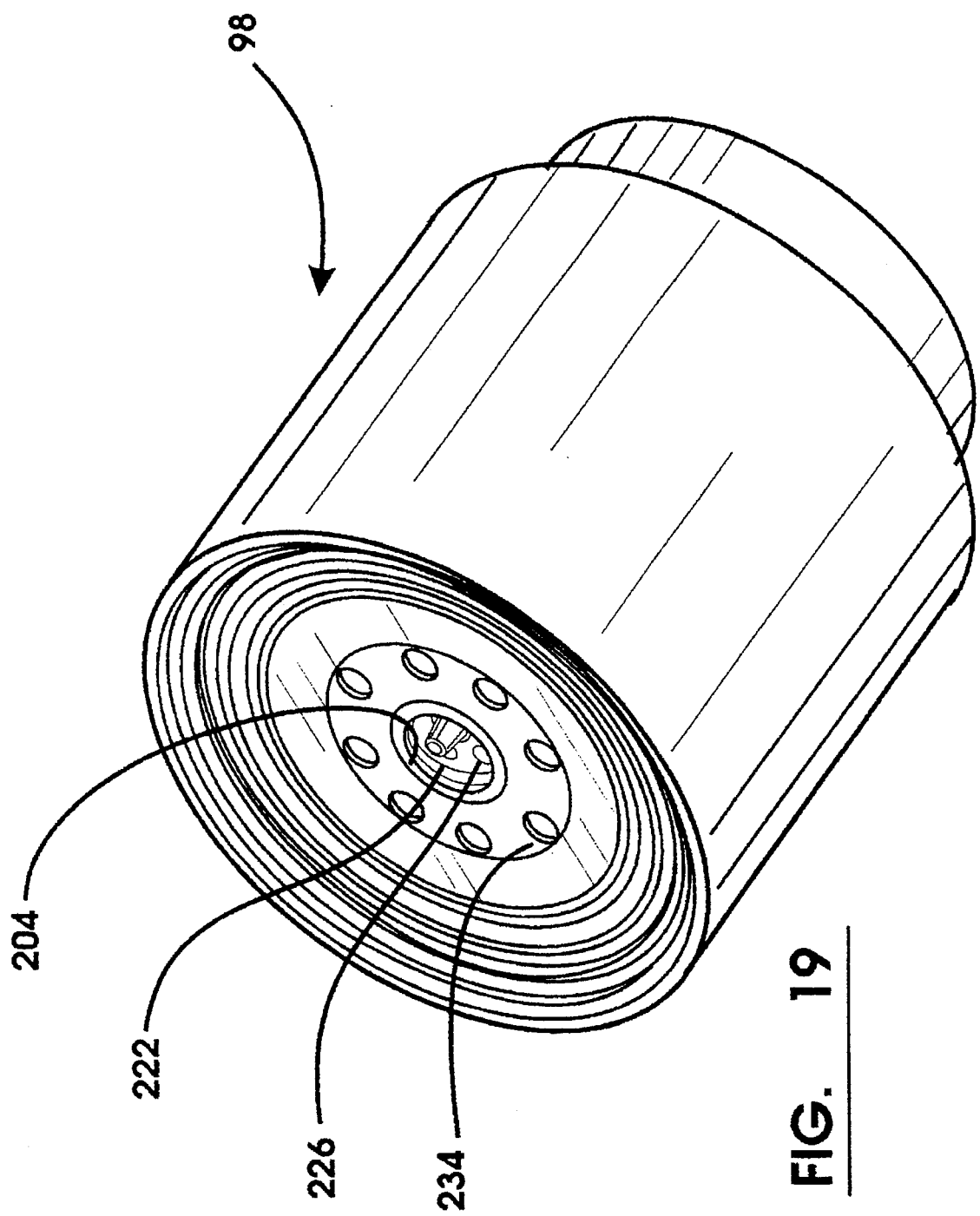
FIG. 19 is an enlarged isometric view of a first end of the filter element shown in FIG. 18.
Figure 20:
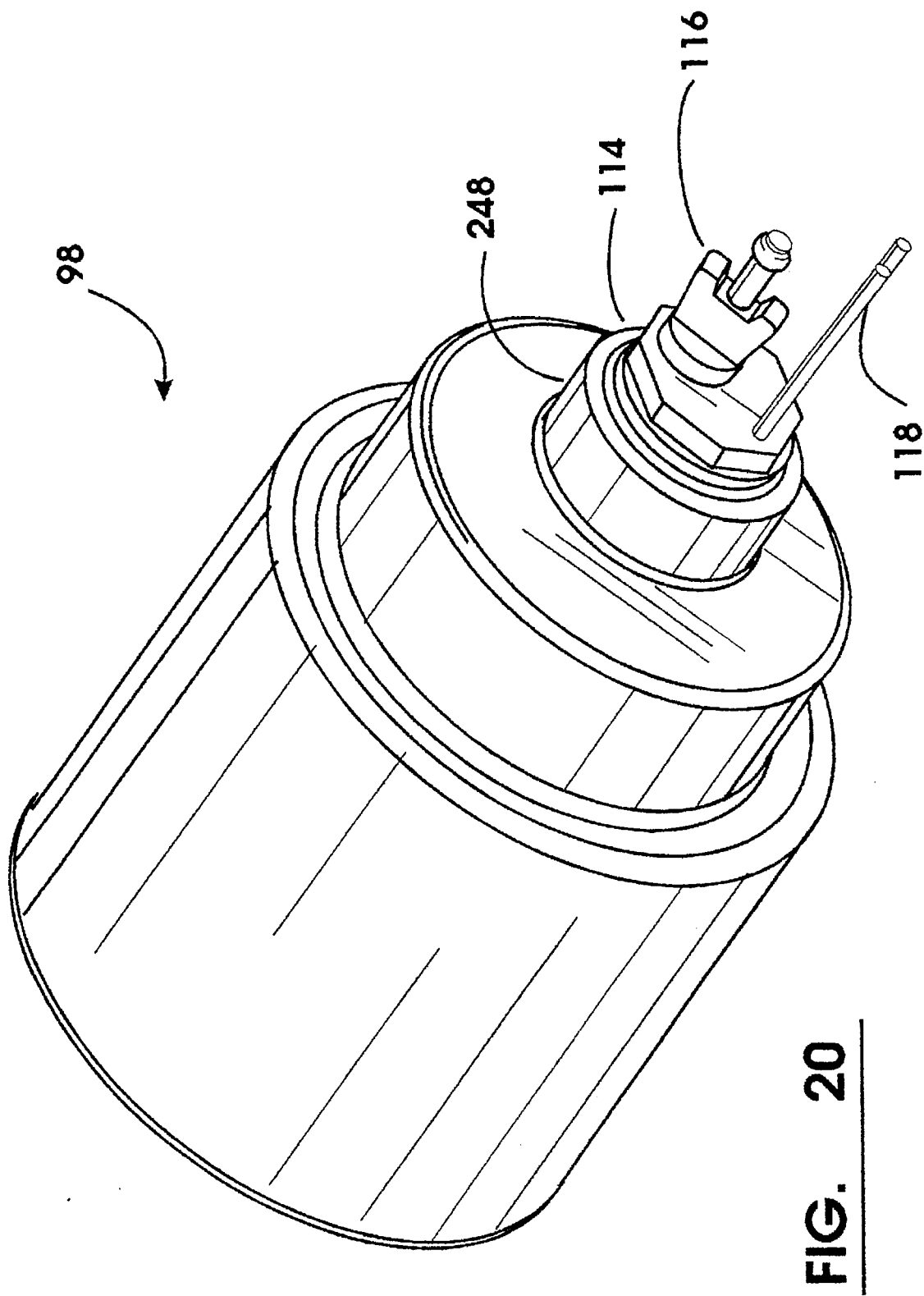
FIG. 20 is an enlarged isometric view of a second end of the filter element shown in FIG. 19.

A central disk shaped portion 220 spans the longitudinal wall 218 of the first end cap. An actuating projection 222 extends longitudinally outward from the central portion 220. The actuating projection 222 has a free end 224 which is positioned longitudinally inward from the tap plate 202. The central portion 220 includes a plurality of fluid passages 226 therethrough (see FIGS. 18 and 19). The fluid passages 220 enable fluid to pass through the first end cap in the recessed area bounded by wall 218.

A resilient seal 228 is positioned intermediate of the inside of tap plate 202 and first end cap 216. Seal 228 surrounds opening 204 in the tap plate and extends inwardly so as to annularly engage the radially extending surface and longitudinal wall 218 of first end cap 216. Seal 228 further includes a radially inward projection 230 which extends inward from a radially extending annular outer face of the seal. The seal 228 is held in compressed relation between the first end cap 216 and the tap plate 202 and further serves to segregate the fuel in the peripheral fuel chamber 210 from the fuel in the central fuel chamber 212.

The tap plate 202 includes a plurality of angularly spaced second tap plate openings 234. The second tap plate openings 234 are disposed radially outward from seal 228 and are in communication with peripheral fuel chamber 210 of the element. A resilient annular seal 236 extends radially outward beyond openings 238 on the exterior of the element.

As shown in FIG. 16, when the element 98 is engaged to the head 96, the threaded enlarged area of nipple portion 186 engages the threaded opening 204 in the tap plate to securely hold the element to the head. When the element is engaged to the head, the inward projection 230 of seal 228 engages the interiorly extending area of nipple portion 186 to provide a leak resistant connection with the central fuel chamber. Further, the free end 224 of actuating projection 222 is positioned to engage valve element 196 and move it away from opening 198 to enable fluid to flow through opening 198 from the central fuel chamber 212 of the element. This enables the central fuel chamber of the element to be in connection with the outlet 102 of the head.

With element 98 attached to the head by engagement between the nipple portion and the tap plate, seal 236 engages the head circumferentially outward of the second tap plate openings 234 in fluid tight relation. This provides a fluid tight region between the nipple portion and seal 236. Fuel that passes out of the head through the openings 194 in the heater chamber 182, flows into this region and passes through the second tap plate openings 234. As a result, fuel from the head flows into the peripheral fuel chamber 210 between the media 208 and the housing of the element. Fuel is thereby required to pass in outside/in fashion through the media 208 and be filtered before it reaches the outlet 102.

The actuating projection 222 and valve element 196 functions to close off any flow through the nipple portion when the element is removed. As a result, fuel spillage is minimized. Further, this feature minimizes the amount of air that gets into the system. This is particularly useful if the fuel filter is mounted in a vertically low position in the system. In such cases a large quantity of fuel could otherwise drain out. This could cause the fuel lines to become air bound and cause great difficult in starting the engine and/or require excessive priming before the engine will start.

A further advantage of the construction shown is that the actuating projection 222, the nipple portion and valve member must have a precise mating relationship to enable the filter element to be engaged with the head and to work properly in conjunction therewith. This is important when the tap plate configuration is similar for different types of fuel filter/separator elements, many of which would not be suitable for the particular application. By varying the longitudinal position of the actuating member and the length of the nipple portion extending into the central fuel chamber of the element so that each corresponds only for the proper filter type, it may be assured that only the correct filter element is installed on the head. This is achieved because if the nipple portion is "too long" for the filter element, the inner face of the nipple portion will bottom out against the central portion 220 inside the element before the threads on the nipple portion and the tap plate engage. Similarly, if the nipple portion is "too short" the actuating projection will not engage the valve element. As a result, the valve element will stay closed and it will not be possible to prime the element or start the engine. Therefore, regardless of what type of error is made, an improper element will not work in conjunction with the filter head.

Figure 23:
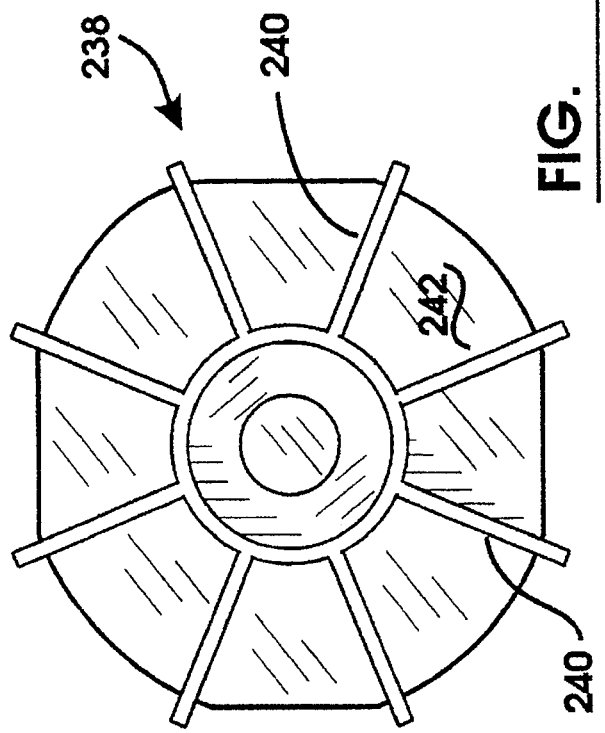
FIG. 23 is a bottom view of the second end cap shown in FIG. 17.
Figure 21:
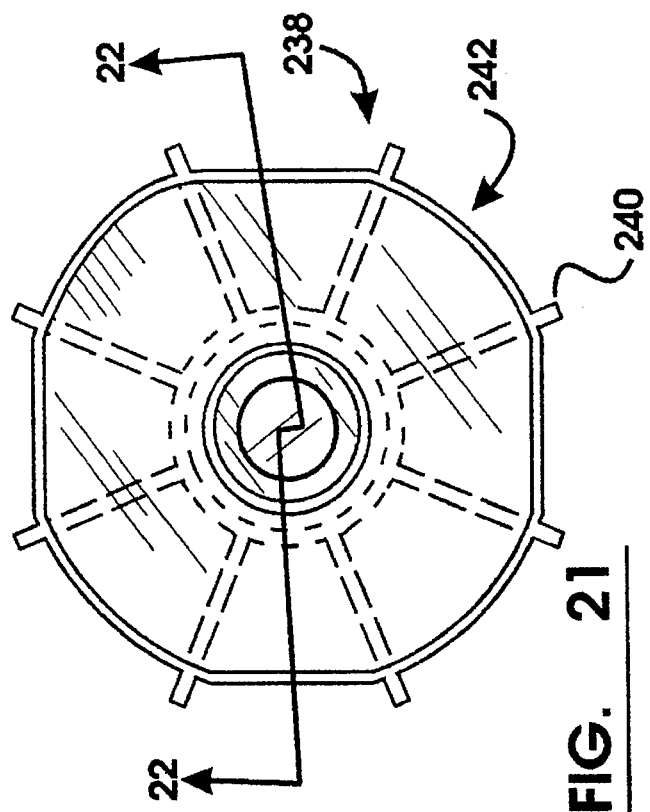
FIG. 21 is a top view of the second end cap of the filter element shown in FIG. 17.
Figure 22:
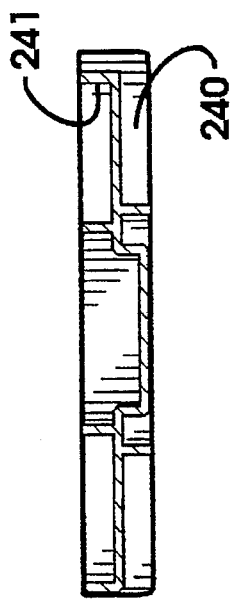
FIG. 22 is a sectional view of the second end cap along line 22—22 in FIG. 21.

Referring again to the cross sectional view of the element shown in FIG. 17, the media 208 is bounded at a second longitudinal end by a second end cap 238 which is a disk shape member. The second end cap 238 is shown in detail in FIGS. 21 through 23. The second end cap includes a plurality of radially extending projections 240 that extend outward from the end cap to the peripheral fuel chamber 210. The projections 240 have annular spaces 242 therein-between. The second end cap 238 also includes an up-turned annular projection 241 for bounding the exterior of the media.

The housing 206 includes an annularly in-turned portion 244. The in-turned portion 244 supports the projections 240 of second end cap 238. Contaminants which collect on the surface of the media in the peripheral fuel chamber are enabled to fall downward in the housing and pass through the spaces 242 between the projections 240. Such contaminants collect in a contaminant collection area 246 in a lower portion of the housing.

The projections 240 also extend radially outward from the media and serve to maintain the media in spaced relation away from the inside wall of the housing. This along with annular projection 241 prevents the media from becoming dislodged even in a severe vibration environment such as when attached to an engine. Further, the supported relation of the projections on the in-turned portion of the housing enable seal 228 to be compressed between the first end cap and the tap plate. The compression of the seal provides a longitudinal force that not only maintains fluid separation between the central fuel chamber and the peripheral fuel chamber but also helps to avoid separation of the media from its end caps inside the housing.

The contaminant collection chamber 246 inside the housing is bounded at its lower end by a tapered annular portion. The housing further includes at its lower end a longitudinally extending wall portion 248. Wall portion 248 terminates in an annular in-turned lip 250. Lip 250 supports an internally threaded ring shaped member 252 which threadably accepts threads on bottom cap 114 therein. A seal 254 extends between the bottom cap and the ring member 252. In addition, an annular outward extending shoulder 256 of the cap engages the in-turned lip 250 to insure a fluid tight fit when the cap is mounted to the housing.

The drain valve 116 and electrical connector 118 extend from the bottom of cap 114. The contaminant collection area 246 has a water sensor generally indicated 258 therein. The water sensor includes a longitudinally extending post 260 which extends from cap 114. The post has an enlarged head 262 which is adapted to be in closely disposed relation from the lower end cap 238. The closely spaced post and end cap further provide an opportunity for central support of the lower end cap should it undergo deformation due to excessive pressure or deformation of the outer housing.

A floatable member 264 is slidably movable longitudinally on post 260. Floatable member 264 is buoyant in contaminants such as water so that when the level of contaminants in area 246 rises, floatable member 264 will rise as well. An inductance sensor in post 260 is used to provide an electrical signal indicative of the position of floatable member 264. The electrical signal is used to indicate that the contaminant collection area is filled with contaminants. Typically this electrical signal is transmitted via connector 118 to an appropriate warning device such as a light.

Figure 24:
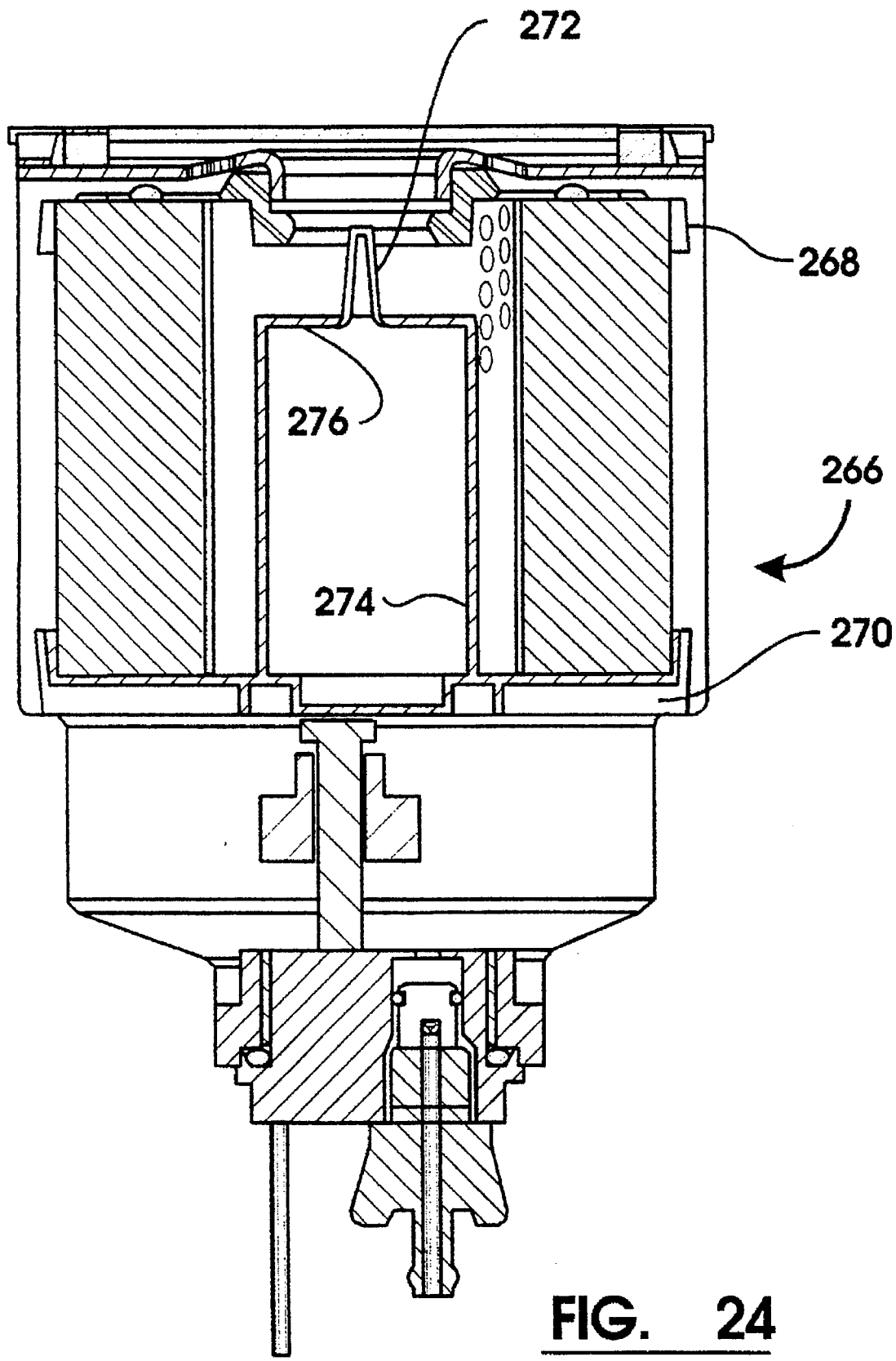
FIG. 24 is an alternative embodiment of a filter element.

An alternative embodiment filter element 266 suitable for use with a filter head similar to head 96 is shown in FIG. 24. Element 266 is similar to element 96 in all aspects except that it has a first end cap 268 which does not include an actuating projection. Rather, element 266 has a second end cap 270 which includes an actuating projection 272 thereon. The second end cap also has a longitudinally extending annular wall 274 which is radially inwardly disposed from the filter media. A central portion 276 of the second end cap spans the annular wall and includes the actuating projection thereon. Unlike the prior embodiment, central portion 276 does not include fluid passages there-through. The first end cap of element 266 includes an annular opening and supports the resilient seal between the first end cap and the tap plate.

The element 266 may be made with annular internal walls of various longitudinal lengths tailored to the length of the nipple portions in various filter heads. By varying the length of wall 274 of the second end cap 270 the invention ensures that only the proper filter element type will work with the head in the fuel system. Further, the alternative embodiment element 266 provides all of the other advantages associated with element 98 which were previously described.

Thus, the new filter and priming pump of the present invention achieves the above stated objectives, eliminates difficulties encountered in the use of prior devices, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given are by way of examples and the invention is not limited to the exact details shown or described.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

We claim:

1. A filter for mounting to a filter head including a nipple portion having a valve element therein, said filter comprising:

a generally cylindrical housing having a central axis, a first open end and a second end;

an annular ring of filter media in said housing surrounding said central axis, said filter media having first and second ends spaced along said central axis and separating a central chamber bounded by said media from a peripheral chamber surrounding said media;

a first end cap including an annular portion attached to said media at the first end thereof, said annular portion surrounding and defining a central opening;

a second end cap including an annular portion attached to said media ring at the second end thereof;

one of said first and second end caps including a longitudinally extending support member surrounding said central axis and having a first end joined to the annular portion of said one of said first and second end caps and a second free end positioned between the annular portions of said first and second end caps;

a longitudinally extending actuating projection mounted in said housing and positioned in said central chamber, said actuating projection having a free end and a base mounted with respect to said media, said free end of said actuating projection being closer to said first end of said housing than said base, and said base being directly supported by said second free end of said longitudinally extending support member and said actuating projection extending axially from said longitudinally extending support member parallel to said central axis;

a tap plate at said first end of said housing, said tap plate including a threaded tap plate opening for threaded attachment to the nipple portion at external threads on the nipple portion, said tap plate opening being in diametrically centered alignment with said actuating projection;

a first annular resilient seal extending between and in sealing relation with said tap plate and said first end cap, said first seal in surrounding relation of said first tap plate opening, said free end of said actuating projection being positioned interiorly of said housing; said first seal circumferentially bounding said central opening, and said free end of said actuating projection being smaller in transverse dimension than said central opening.

2. A filter according to claim 1, wherein said first annular resilient seal is in longitudinally compressed relation between said first tap plate and said first end cap for sealing the first tap plate opening of said tap plate to the central opening of said first end cap.

3. The filter according to claim 2 wherein said housing comprises an annular in-turned portion adjacent the second end of said media, said annular in-turned portion in supporting relation of said media, whereby said first annular resilient seal is held in compressed relation between said first end cap and said tap plate.

4. The filter according to claim 2 wherein said first seal further comprises an annular, inward radially extending seal projection positioned longitudinally interiorly of said tap plate, whereby a nipple portion extending through said tap plate opening is annularly engaged with said seal projection in fluid tight relation.

5. The filter according to claim 2 wherein said first seal is engaged with a first annular end cap wall supported on said annular portion of said first end cap, said first annular end cap wall extending longitudinally and radially inwardly disposed from said media in said central chamber.

6. The filter according to claim 2 wherein said free end of said actuating projection is disposed longitudinally interiorly of a longitudinally outer face of said radially inner portion of said first seal.

7. The filter according to claim 1, wherein said tap plate includes at least one second tap plate opening therethrough disposed radially outward of said first resilient seal, and wherein said second tap plate opening is fluidly open to said peripheral chamber.

8. A filter according to claim 1, wherein said first annular resilient seal is in circumferentially surrounding relation and radially outwardly spaced from said free end of said actuating projection.

9. A filter according to claim 1, wherein said longitudinally extending support member includes an axially extending annular end cap wall in said central chamber and radially disposed inwardly from said annular ring of filter media.

10. A filter according to claim 9, wherein said longitudinally extending support member further includes a central end wall portion spanning said annular end cap wall, and said actuating projection has the base thereof connected to said central end wall portion.

11. A filter according to claim 1, wherein said one of said first and second end caps is said second end cap.

12. A filter according to claim 1, wherein said one of said first and second end caps is said first end cap.

13. A filter according to claim 12, wherein said central projection support portion includes at least one fluid passage therethrough.

14. A filter according to claim 1, wherein the base of said actuating projection has a transverse dimension smaller that the corresponding dimension of said second free end of said longitudinally extending support member, thereby to form an abutment at the juncture of said base and second free end.

15. A filter in combination with a filter head including a nipple portion having a valve element therein, said filter comprising:

a generally cylindrical housing having a central axis, a first open end, and a second end;

an annular ring of filter media in said housing surrounding said central axis, said filter media having first and second ends spaced along said central axis;

a first end cap attached to said media at said first end adjacent the first end of said housing;

a second end cap attached at an annular portion thereof to said media at said second end and positioned adjacent to the second end of said housing;

wherein said ring of filter media and said first and second end caps separate a central chamber located within said ring of filter media and first and second end caps from a peripheral chamber surrounding said ring of filter media;

said first end cap including an annular portion surrounding and defining a central opening; and one of said first and second end caps including a longitudinally extending actuating projection extending axially in said central chamber, said longitudinally extending actuating projection having a base and a free end, said base being positioned closer to said second end cap than said free end and said free end in said central chamber positioned adjacent the central opening of said first end cap; and a first annular resilient seal in circumferentially surrounding relation and radially outwardly spaced from said free end of said actuating projection, said seal being adjacent said central opening for engaging the nipple portion when the nipple portion extends through said central opening for engagement of the actuating projection with the valve element in the nipple portion;

whereby the free end of said actuating projection is configured and arranged to open the valve element within the nipple portion when the nipple portion is engaged with the first seal; and wherein said base is connected to said annular portion of said one of said first and second end caps by connecting structure extending through said central chamber and between said base and the annular portion of said one of said first and second end caps, said connecting structure includes a longitudinally extending annular end cap wall supported on said annular portion of said one of said first and second end caps, said annular end cap wall in said central chamber radially disposed inwardly from said media, and wherein said base of said actuating projection is supported on said annular end cap wall;

said filter further comprising a tap plate closing the first end of said housing, said tap plate including a threaded first tap plate opening threadable onto said nipple portion at external threads on said nipple portion, and said first seal in longitudinally compressed relation between said first tap plate and said first end cap for sealing the first tap plate opening of said tap plate to the central opening of said first end cap;

said nipple portion of said filter head being extendible through said first tap plate opening into said central chamber, said valve element in said nipple portion movable between open and closed positions wherein fluid flow through said nipple portion is enabled or prevented, respectively, and wherein said actuating projection moves said valve element to said open position when said nipple portion extends through said first tap plate opening.

16. The combination according to claim 15, wherein said first seal includes an annual radially inward extending seal projection in said central chamber, said seal projection disposed longitudinally interiorly of said tap plate, said seal projection annularly engaging said nipple portion in compressed relation when said nipple portion extends through said first tap plate opening and moves said valve element to the open position.

17. The combination according to claim 16 wherein said filter further comprises a priming pump in fluid connection with one of said peripheral or central chambers and wherein said priming pump comprises a first check valve means and a second valve means fluidly aligned so that liquid is enabled to flow only in a first flow direction therethrough into said one chamber, said check valve means each bounding a pumping area, said pumping area in fluid communication with a variable volume area.

18. The combination according to claim 17 and further comprising a heater disposed fluidly intermediate of said check valve means and said one chamber, and wherein said heater comprises an annular disk shaped member bounded by a longitudinally extending wall and whereby liquid flows over said longitudinal wall to reach said one chamber.

19. The combination according to claim 15 wherein said nipple portion and said tap plate include engaging means and wherein said valve element is in the open position when said nipple portion and said tap plate are engaged.

20. A filter for mounting to a filter head including a nipple portion having a valve element therein, said filter comprising:

a generally cylindrical housing having a central axis, a first open end, and a second end;

an annular ring of filter media in said housing surrounding said central axis, said filter media having first and second ends spaced along said central axis;

a first end cap attached to said media at said first end adjacent the first end of said housing;

a second end cap attached at an annular portion thereof to said media at said second end and positioned adjacent to the second end of said housing;

wherein said ring of filter media and said first and second end caps separate a central chamber located within said ring of filter media and first and second end caps from a peripheral chamber surrounding said ring of filter media;

said first end cap including an annular portion surrounding and defining a central opening; and said first end cap including a longitudinally extending actuating projection extending axially in said central chamber, said longitudinally extending actuating projection having a base and a free end, said base being positioned closer to said second end cap than said free end and said free end in said central chamber positioned adjacent the central opening of said first end cap; and a first annular resilient seal in circumferentially surrounding relation and radially outwardly spaced from said free end of said actuating projection, said seal being adjacent said central opening for engaging the nipple portion when the nipple portion extends through said central opening for engagement of the actuating projection with the valve element in the nipple portion;

whereby the free end of said actuating projection is configured and arranged to open the valve element within the nipple portion when the nipple portion is engaged with the first seal; and wherein said base is connected to said annular portion of said first end cap by connecting structure extending through said central chamber and between said base and the annular portion of said one of said first and second end caps, said connecting structure includes a longitudinally extending annular end cap wall supported on said annular portion of said one of said first and second end caps, said annular end cap wall in said central chamber radially disposed inwardly from said media, and wherein said base of said actuating projection is supported on said annular end cap wall; and wherein said connecting structure includes a central portion spanning said annular end cap wall, said longitudinally extending projection supported on said central portion and whereby passage of a nipple portion into said central chamber beyond said central portion is prevented; and wherein said central portion comprises a generally disk shaped portion having said actuating projection extending therefrom, and wherein said disk shaped portion includes a plurality of fluid passages angularly spaced about said actuating projection.

21. A filter for mounting to a filter head including a nipple portion having a valve element therein, said filter comprising:

a generally cylindrical housing having a central axis, a first open end, and a second end;

an annular ring of filter media in said housing surrounding said central axis, said filter media having first and second ends spaced along said central axis;

a first end cap attached to said media at said first end adjacent the first end of said housing;

a second end cap attached at an annular portion thereof to said media at said second end and positioned adjacent to the second end of said housing;

wherein said ring of filter media and said first and second end caps separate a central chamber located within said ring of filter media and first and second end caps from a peripheral chamber surrounding said ring of filter media;

said first end cap including an annular portion surrounding and defining a central opening; and one of said first and second end caps including a longitudinally extending actuating projection extending axially in said central chamber, said longitudinally extending actuating projection having a base and a free end, said base being positioned closer to said second end cap than said free end and said free end in said central chamber positioned adjacent the central opening of said first end cap; and a first annular resilient seal in circumferentially surrounding relation and radially outwardly spaced from said free end of said actuating protection, said seal being adjacent said central opening for engaging the nipple portion when the nipple portion extends through said central opening for engagement of the actuating protection with the valve element in the nipple portion;

whereby the free end of said actuating projection is configured and arranged to open the valve element within the nipple portion when the nipple portion is engaged with the first seal; and wherein said filter further comprises a longitudinally extending post attached to the second end of said housing, said post having a head portion terminating outside said central chamber and in closely spaced adjacent relation with said second end cap, and wherein the head portion of said post is engageable with said second end cap to provide central support of the second end cap upon deformation of the second end cap or upon deformation of said housing;

wherein said second end cap comprises a disk shaped member attached at a second end of said media, and wherein said post terminates in closely adjacent relation of said disk shaped member;

wherein said filter further comprises a floatable member longitudinally movable on said post, and wherein said filter further comprises a contaminant collection area disposed interiorly of said housing and longitudinally from said disk shaped member in a first direction away from said filter media, and wherein said floatable member is in said contaminant collection area;

wherein said housing comprises a radially in-turned portion, and wherein said disk shaped member includes a plurality of angularly spaced radially extending projections, said radially extending projections extending in said first direction from said disk shaped member towards said contaminant collection area, said radially extending projections engaged with said in-turned portion of said housing, and wherein said radially extending projections have spaces thereinbetween whereby contaminants are enabled to pass from said peripheral fuel chamber to said contaminant collection area through said spaces.

22. A filter assembly comprising:

a generally cylindrical housing having a central axis, a first open end, and a second end;

an annular ring of filter media in said housing coaxially surrounding said central axis, said filter media having a first and second ends spaced along said central axis;

a first end cap attached to said media at said first end;

a second end cap attached to said media at said second end and positioned adjacent to the second end of said housing;

wherein said ring of filter media and said first and second end caps separate a central chamber located within said ring of filter media and first and second end caps from a peripheral chamber surrounding said ring of filter media;

said first end cap including a central opening;

a longitudinally extending actuating projection extending coaxially of said central axis in said central chamber, said actuating projection having a base and a free end, said base being positioned closer to said second end cap than said free end and said free end positioned in said central chamber closer to the central opening of said first end cap than said base; and a filter head including a nipple portion extendible into said central chamber through said central opening of said first end cap, said nipple portion having an opening positioned in said central chamber, said nipple portion further including a valve therein for controlling fluid flow therethrough, said free end of said actuating projection acceptable in said opening in said nipple portion, and wherein when said actuating projection is accepted in said opening, said valve is moved thereby to an open condition; end a first annular resilient seal having a seal opening therethrough, said seal in circumferentially surrounding relation of said free end of said actuating protection and wherein said seal annularly engages said nipple portion when said actuating projection is accepted in said opening of said nipple portion; and wherein said media is connected to said first end cap at a first longitudinal end thereof, said first end cap supporting said actuating projection, and wherein said first end cap includes an annular longitudinally extending end cap wall, and wherein said resilient seal extends radially inwardly and longitudinally interiorly adjacent said annular said end cap wall, and wherein when said actuating projection is accepted in said opening of said nipple portion said seal is positioned in annular intermediate compressed relation between said nipple portion and said annular longitudinally extending end cap wall.

23. A filter assembly comprising a filter and a filter head, said filter comprising:
    a generally cylindrical housing having a central axis, a first open end and a second end;
    an annular ring of filter media in said housing surrounding said central axis, said filter media having first and second ends spaced along said central axis and separating a central chamber bounded by said media from a peripheral chamber surrounding said media;
    a longitudinally extending actuating projection mounted in said housing and positioned in said central chamber, said actuating projection having a free end and a base mounted with respect to said media, said free end being closer to said first end of said housing than said base;
    a tap plate at said first end of said housing, said tap plate including a threaded first tap plate opening therethrough axially aligned with said actuating projection; and said filter head including
    a nipple portion onto which said tap plate is threaded at external threads on said nipple portion,
    said nipple portion extending through said first tap plate opening into said central chamber,
    said nipple portion including a movable valve element therein,
    said valve element movable between open and closed positions wherein fluid flow through said nipple portion is enabled or prevented, respectively, and
    wherein said actuating projection moves said valve element to the open position when said nipple portion extends through said first tap plate opening.

24. A filter for mounting to a filter head including a nipple portion having a valve element therein, said filter comprising:
    a generally cylindrical housing having a central axis, a first open end and a second end;
    an annular ring of filter media in said housing surrounding said central axis, said filter media having first and second ends spaced along said central axis and separating a central chamber bounded by said media from a peripheral chamber surrounding said media;
    a first end cap proximate said first open end add being attached to said media at the first end thereof and including an annular portion surrounding and defining a central opening;
    a longitudinally extending annular end cap wall supported on said first end cap, said annular end cap wall disposed radially inwardly from said media;
    a central portion spanning said annular end cap wall;
    a longitudinally extending actuating projection having a base connected to said central portion and a free end extending from said central portion towards said first end of said housing, said actuating projection being stationary relative to said media, and at least one fluid passage through said central portion; and
    an annular seal adjacent said first end of said housing and circumferentially bounding said central opening, said free end of said actuating projection being smaller in transverse dimension than said central opening.

25. A filter for mounting to a filter head including a nipple portion having a valve element therein, said filter comprising:
    a generally cylindrical housing having a central axis, a first open end and a second end;
    an annular ring of filter media in said housing surrounding said central axis, said filter media having first and second ends spaced along said central axis and separating a central chamber bounded by said media from a peripheral chamber surrounding said media;
    a first end cap proximate said first open end and being attached to said media at the first end thereof, said first end cap including a longitudinally extending annular end cap wall, said annular end cap wall disposed radially inward from said media; a central portion spanning said annular end cap wall; and a longitudinally extending actuating projection extending longitudinally from said central portion and stationary relative to said annular end cap wall, and wherein said first end cap includes at least one fluid passage therethrough, said fluid passage positioned in said central chamber; and
    an annular seal adjacent said first end of said housing and circumferentially bounding a central opening in said first end cap, said actuating projection having a base and a free end, said base positioned closer to said second end cap than said free end, said free end of said actuating projection being smaller in transverse dimension than said central opening.

26. A filter according to claim 25, wherein said annular seal is in circumferentially surrounding relation and radially outwardly spaced from said free end of said actuating projection.

27. A filter according to claim 25, further comprising a tap plate closing the first end of said housing and including a threaded first tap plate opening for threaded attachment to the nipple portion at external threads on the nipple portion.

28. A filter according to claim 27, wherein said annular seal is in longitudinally compressed relation between said tap plate and said first end cap for sealing the tap plate opening of said tap plate to the central opening of said first end cap.

29. The filter according to claim 28, wherein said housing comprises an annular in-turned portion adjacent the second end of said media, said annular in-turned portion-in supporting relation of said media, whereby said annular seal is held in compressed relation between said first end cap and said tap plate.

30. A filter according to claim 29, wherein said annular seal is in circumferentially surrounding relation and radially outwardly spaced from said free end of said actuating projection.

* * * * *

UNITED STATES PATENT AND TRADEMARK OFFICE
CERTIFICATE OF CORRECTION

PATENT NO. : 5,643,446
APPLICATION NO. : 08/150709
DATED : July 1, 1997
INVENTOR(S) : Michael D. Clausen, Russell D. Jensen and Walter H. Stone Page 1 of 1

It is certified that error appears in the above-identified patent and that said Letters Patent is hereby corrected as shown below:

Column 19, lines 15-16, "said one of said first and second end caps" should read --said first end cap--.

Column 19, lines 18-19, "said one of said first and second end caps" should read --said first end cap--.

Signed and Sealed this

Eighth Day of July, 2008

JON W. DUDAS
*Director of the United States Patent and Trademark Office*

(12) EX PARTE REEXAMINATION CERTIFICATE (8492nd)
United States Patent
Clausen et al.

(10) Number: US 5,643,446 C1
(45) Certificate Issued: Aug. 30, 2011

(54) FUEL FILTER AND PRIMING PUMP

(75) Inventors: Michael D. Clausen, Turlock, CA (US); Russell D. Jensen, Modesto, CA (US); Walter H. Stone, Modesto, CA (US)

(73) Assignee: Parker Intangibles LLC, Cleveland, OH (US)

Reexamination Request:
No. 90/011,552, Mar. 8, 2011

Reexamination Certificate for:
Patent No.: 5,643,446
Issued: Jul. 1, 1997
Appl. No.: 08/150,709
Filed: Nov. 10, 1993

Certificate of Correction issued Jul. 8, 2008.

Related U.S. Application Data

(63) Continuation-in-part of application No. 08/028,101, filed on Mar. 8, 1993, now Pat. No. 5,362,392, and a continuation-in-part of application No. 08/097,787, filed on Jul. 27, 1993, now abandoned, which is a division of application No. 07/683,096, filed on Apr. 10, 1991, now Pat. No. 5,244,571, which is a continuation of application No. 07/586,827, filed on Sep. 24, 1990, now abandoned, which is a division of application No. 07/370,097, filed on Jun. 20, 1989, now Pat. No. 4,997,555, which is a continuation of application No. 07/242,791, filed on Sep. 9, 1988, now abandoned, which is a continuation of application No. 07/032,834, filed on Mar. 30, 1987, now abandoned, which is a continuation-in-part of application No. 06/784,292, filed on Oct. 7, 1985, now Pat. No. 4,692,245, which is a continuation-in-part of application No. 06/733,808, filed on May 14, 1985, now Pat. No. 4,668,393.

(51) Int. Cl.
*B01D 35/14* (2006.01)

(52) U.S. Cl. .................. 210/184; 210/234; 210/235; 210/416.4; 210/444; 210/450; 210/455

(58) Field of Classification Search .................. None
See application file for complete search history.

(56) References Cited

U.S. PATENT DOCUMENTS

| | | | |
|---|---|---|---|
| 1,407,763 A | 2/1922 | Langston |
| 1,468,906 A | 9/1923 | Inman |
| 1,742,743 A | 1/1930 | Worbois |
| 1,746,336 A | 2/1930 | Breer |
| 1,789,611 A | 1/1931 | Van Ranst |

(Continued)

FOREIGN PATENT DOCUMENTS

| | | |
|---|---|---|
| BE | 570727 | 9/1958 |
| CA | 824484 | 7/1969 |
| DE | 0532784 | 9/1931 |
| DE | 1909130 U | 9/1970 |
| DE | 1909130 A1 | 9/1970 |

(Continued)

OTHER PUBLICATIONS

U.S. Appl. No. 29/232,887, filed Mar. 2007, Watson.

*Primary Examiner* — Joseph A. Kaufman

(57) ABSTRACT

A fuel filter comprises a head (10, 96) having an inlet (14, 100) and an outlet (16,102). The head has a pumping portion (18, 104) which includes a vertically extending stepped bore (46, 120) having movable bodies (86, 88; 132 140) therein. The fluid area between the bodies (54, 126) is connected to a variable volume area (77, 160). The head is connected to an element (98, 266) by a nipple portion (186) which has a valve element (196) therein. An actuating projection (222, 272) is engagable with said valve element to open flow through said nipple portion when the correct element is attached thereto. The failure of the nipple portion to sufficiently extend in the element, which occurs when an improper element is attached, prevents flow through the nipple portion and renders the filter inoperable. The actuating projection is further supported on a central portion (220, 276) which prevents connection to a nipple portion that extends too far into the element. As a result, only the proper element may be mounted to the head.

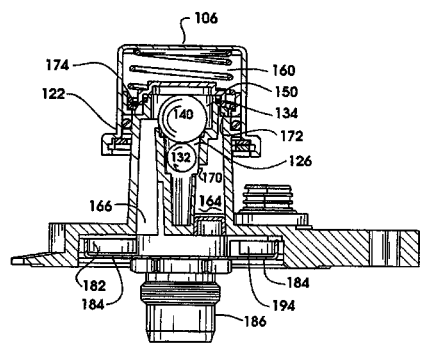

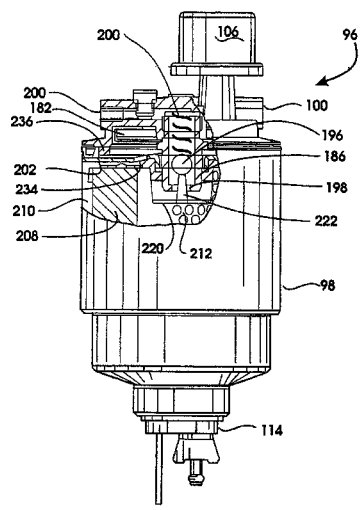

U.S. PATENT DOCUMENTS

| | | | |
|---|---|---|---|
| 1,805,903 A | 5/1931 | Bull |
| 1,861,576 A | 6/1932 | Liddell |
| 1,951,484 A | 3/1934 | Lawes |
| 2,071,529 A | 2/1937 | Howard |
| 2,304,618 A | 12/1942 | Williams |
| 2,365,237 A | 12/1944 | Allen, Jr. |
| 2,418,777 A | 4/1947 | Le Clair |
| 2,431,782 A | 12/1947 | Walton |
| 2,478,109 A | 8/1949 | Kamrath |
| 2,496,688 A | 2/1950 | Armstrong |
| 2,507,818 A | 5/1950 | Sager |
| 2,524,336 A | 10/1950 | Vokes |
| 2,533,266 A | 12/1950 | Kovacs |
| 2,544,244 A | 3/1951 | Vokes |
| 2,642,187 A | 6/1953 | Bell |
| 2,729,339 A | 1/1956 | McCoy |
| 2,858,026 A | 10/1958 | Lorimer |
| 3,040,894 A | 6/1962 | Pall |
| 3,056,503 A | 10/1962 | Roosa |
| 3,105,042 A | 9/1963 | Roosa |
| 3,122,501 A | 2/1964 | Hultgren |
| 3,151,071 A | 9/1964 | Kasten |
| 3,216,571 A | 11/1965 | Whiting |
| 3,220,351 A | 11/1965 | Kling |
| 3,232,437 A | 2/1966 | Hultgren |
| 3,280,981 A | 10/1966 | Renfrew |
| 3,312,351 A | 4/1967 | Kasten |
| 3,363,762 A | 1/1968 | Ensign |
| 3,388,801 A | 6/1968 | Boyd |
| 3,429,274 A | 2/1969 | Nilsson |
| 3,473,664 A | 10/1969 | Hultgren |
| 3,487,932 A | 1/1970 | Forrester |
| 3,502,218 A | 3/1970 | Tuffnell |
| 3,529,727 A | 9/1970 | Bernhard |
| 3,565,555 A | 2/1971 | Akashi |
| 3,589,517 A | 6/1971 | Palmai |
| 3,608,726 A | 9/1971 | Crowther |
| 3,674,043 A | 7/1972 | Norton |
| 3,710,942 A | 1/1973 | Rosenberg |
| 3,931,011 A | 1/1976 | Richards |
| 4,035,306 A | 7/1977 | Maddocks |
| 4,052,307 A | 10/1977 | Humbert, Jr. |
| 4,083,780 A | 4/1978 | Call |
| 4,237,015 A | 12/1980 | Fearnhead |
| 4,241,787 A | 12/1980 | Price |
| 4,257,890 A | 3/1981 | Hurner |
| 4,292,179 A | 9/1981 | Stone |
| 4,296,810 A | 10/1981 | Price |
| 4,372,847 A | 2/1983 | Lewis |
| 4,387,691 A | 6/1983 | Marcoux |
| 4,406,785 A | 9/1983 | Siefer |
| 4,425,239 A | 1/1984 | Jacocks |
| 4,437,986 A | 3/1984 | Hutchins |
| 4,491,120 A | 1/1985 | Hodgkins |
| 4,500,425 A | 2/1985 | Thornton |
| 4,501,255 A | 2/1985 | Van Der Ploeg |
| 4,502,955 A | 3/1985 | Schaupp |
| 4,502,956 A | 3/1985 | Wilson |
| 4,508,621 A | 4/1985 | Jackson |
| 4,522,712 A | 6/1985 | Fischer |
| 4,565,629 A | 1/1986 | Wilson |
| 4,585,924 A | 4/1986 | Pakula |
| 4,596,224 A | 6/1986 | Prager |
| 4,608,161 A | 8/1986 | Niemeier |
| 4,619,764 A | 10/1986 | Church |
| 4,668,393 A | 5/1987 | Stone |
| 4,692,245 A | 9/1987 | Church |
| 4,732,671 A | 3/1988 | Thornton |
| 4,738,776 A | 4/1988 | Brown |
| 4,747,760 A | 5/1988 | Eberl |
| 4,765,893 A | 8/1988 | Kohlheb |
| 4,836,923 A | 6/1989 | Popoff |
| 4,855,041 A | 8/1989 | Church |
| 4,860,713 A | 8/1989 | Hodgkins |
| 4,935,127 A | 6/1990 | Lowsky |
| 4,956,081 A | 9/1990 | Hodgkins |
| 4,971,528 A | 11/1990 | Hodgkins |
| 4,997,555 A | 3/1991 | Church |
| 5,020,610 A | 6/1991 | Lyon |
| 5,049,269 A | 9/1991 | Shah |
| 5,084,170 A | 1/1992 | Janik |
| 5,207,898 A | 5/1993 | Hodgkins |
| 5,244,571 A | 9/1993 | Church |
| 5,362,390 A | 11/1994 | Widenhoefer |
| 5,736,040 A | 4/1998 | Duerrstein |
| 5,922,196 A | 7/1999 | Baumann |
| 6,120,685 A | 9/2000 | Carlson |
| 6,488,848 B1 | 12/2002 | Smith |
| 6,835,305 B1 | 12/2004 | Baumann |

FOREIGN PATENT DOCUMENTS

| | | |
|---|---|---|
| DE | 1915923 A1 | 10/1970 |
| DE | 2216228 | 10/1972 |
| DE | 2817570 | 10/1978 |
| DE | 3249144 C2 | 3/1986 |
| DE | 3432855 | 3/1986 |
| DE | 3607569 A1 | 9/1986 |
| DE | 90 16 240.4 | 3/1991 |
| EP | 0079841 A1 | 5/1983 |
| EP | 0087722 | 9/1983 |
| EP | 0088148 | 9/1983 |
| EP | 0164548 A2 | 12/1985 |
| EP | 0214727 A1 | 3/1987 |
| EP | 0250861 A2 | 1/1988 |
| EP | 0260069 | 3/1988 |
| EP | 0289188 A2 | 11/1988 |
| EP | 0333469 A1 | 9/1989 |
| EP | 0339229 | 11/1989 |
| EP | 0344633 | 12/1989 |
| EP | 426064 A2 | 5/1991 |
| EP | 0483119 A3 | 4/1992 |
| EP | 0483119 | 4/1992 |
| EP | 0483119 A2 | 4/1992 |
| EP | 0532161 A1 | 3/1993 |
| EP | 2047107 A1 | 8/2007 |
| FR | 686520 A | 6/1930 |
| FR | 708287 A | 6/1931 |
| GB | 1075424 A | 7/1967 |
| GB | 2093363 A | 9/1982 |
| GB | 2115305 A | 9/1983 |
| GB | 2231097 A | 11/1990 |
| JP | 49-118463 | 11/1974 |
| JP | 61-500208 | 2/1986 |
| JP | 6282267 | 4/1987 |
| JP | 63-294985 | 12/1988 |
| JP | 2-227554 | 9/1990 |
| JP | 4-57211 | 2/1992 |
| JP | 5-39611 | 2/1993 |
| JP | 577204 | 10/1993 |
| WO | 85-01885 | 5/1985 |
| WO | 90-07369 | 7/1990 |
| WO | 93-10881 | 6/1993 |
| WO | 2008015233 A1 | 2/2008 |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 20 and 24-26 is confirmed.

Claims 1-19, 21-23 and 27-30 were not reexamined.

* * * * *